United States Patent
Chen et al.

(10) Patent No.: US 12,160,003 B2
(45) Date of Patent: Dec. 3, 2024

(54) ELECTRODE ASSEMBLY AND SECONDARY BATTERY COMPRISING THE SAME, BATTERY MODULE, BATTERY PACK AND ELECTRICAL DEVICE

(71) Applicant: CONTEMPORARY AMPEREX TECHNOLOGY (HONG KONG) LIMITED, Hong Kong (CN)

(72) Inventors: Junguang Chen, Ningde (CN); Cong Cheng, Ningde (CN); Haile Pei, Ningde (CN); Shengwu Zhang, Ningde (CN); Xinghui Wang, Ningde (CN); Shisong Li, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/617,506

(22) Filed: Mar. 26, 2024

(65) Prior Publication Data

US 2024/0313224 A1 Sep. 19, 2024

Related U.S. Application Data

(63) Continuation of application No. PCT/CN2022/085463, filed on Apr. 7, 2022.

(51) Int. Cl.
*H01M 4/62* (2006.01)
*H01M 4/02* (2006.01)

(52) U.S. Cl.
CPC ...... *H01M 4/622* (2013.01); *H01M 2004/021* (2013.01); *H01M 2004/028* (2013.01)

(58) Field of Classification Search
None
See application file for complete search history.

(56) References Cited

U.S. PATENT DOCUMENTS

2017/0256777 A1 9/2017 Akikusa et al.
2017/0263933 A1* 9/2017 Akikusa ................ H01M 4/623

FOREIGN PATENT DOCUMENTS

| CN | 201699089 U | 1/2011 |
| CN | 102544515 A | 7/2012 |
| CN | 107785583 A | 3/2018 |
| CN | 109686918 A | 4/2019 |
| CN | 110752345 A | 2/2020 |
| JP | 2008010253 A | 1/2008 |
| JP | 2012190625 A | 10/2012 |

OTHER PUBLICATIONS

Machine translation of CN110752345, published on Feb. 4, 2020 (Year: 2020).*
Machine translation of JP2012-190625, published on Oct. 4, 2012 (Year: 2012).*
The World Intellectual Property Organization (WIPO) International Search Report and Written Opinion for PCT/CN2022/085463 Aug. 16, 2022 11 Pages (including translation).

* cited by examiner

*Primary Examiner* — Anca Eoff
(74) *Attorney, Agent, or Firm* — ANOVA LAW GROUP, PLLC

(57) ABSTRACT

An electrode assembly includes a water-based positive electrode plate and a negative electrode plate, wherein the water-based positive electrode plate includes a positive electrode current collector and a positive electrode film layer located on at least one surface of the positive electrode current collector; and the negative electrode plate comprises a negative electrode current collector and a negative electrode film layer located on at least one surface of the negative electrode current collector; at least part of surface of the water-based positive electrode plate is provided with a plurality of first micropores, and satisfies: $0.001\% \leq (S_{12} \times H_{12} \times D_1)/(S_{11} \times C_1 \times H_{11}) \leq 1\%$, at least part of surface of the negative electrode plate is provided with a plurality of second micropores, and satisfies: $0 < (S_{22} \times H_{22} \times D_2)/(S_{21} \times C_2 \times H_{21}) \leq 2.5\%$.

18 Claims, 3 Drawing Sheets

ELECTRODE ASSEMBLY AND SECONDARY BATTERY COMPRISING THE SAME, BATTERY MODULE, BATTERY PACK AND ELECTRICAL DEVICE

CROSS-REFERENCE TO RELATED APPLICATION

This application is a continuation of International Application No. PCT/CN2022/085463, filed on Apr. 7, 2022, which is incorporated herein by reference in its entirety.

TECHNICAL FIELD

The present application belongs to the field of battery technology, and specifically relates to an electrode assembly and a secondary battery comprising the same, a battery module, a battery pack, and an electrical device.

BACKGROUND

In recent years, secondary batteries have been widely used in energy storage power systems such as hydraulic, thermal, wind and solar power plants, as well as in many fields such as electric tools, electric bicycles, electric motorcycles, electric vehicles, military equipment, and aerospace. With the application and promotion of secondary batteries, their cost and environmental pollution issues are receiving more and more attention. The positive electrode plate is one of the key factors determining the performance of the secondary battery. The solvent used for the existing positive electrode slurry is usually an oil-based solvent, such as N-methylpyrrolidone (NMP). However, NMP has the drawbacks of requiring high amount, volatility, difficulty in recycling, high toxicity and high cost, which will not only cause serious pollution to the environment but also endanger people's health. The water-based positive electrode slurry using water as solvent is attracting more and more attention from researchers due to its low cost and environmental friendliness. However, the water-based positive electrode plate has the drawbacks of high water content and poor capacity exertion, which limits its practical application.

SUMMARY

An aim of the present application is to provide an electrode assembly and a secondary battery, a battery module, a battery pack and an electrical device comprising the same, so that the electrode assembly using the water-based positive electrode plate and the secondary battery, the battery module, and the battery pack and an electrical device comprising the same have the characteristics of high energy density, good cycle performance, low internal resistance, low cost and environmental friendliness.

The first aspect of the present application provides an electrode assembly, comprising a water-based positive electrode plate and a negative electrode plate, wherein the water-based positive electrode plate comprises a positive electrode current collector and a positive electrode film layer located on at least one surface of the positive electrode current collector, and the positive electrode film layer comprises a positive electrode active material; the negative electrode plate comprises a negative electrode current collector and a negative electrode film layer located on at least one surface of the negative electrode current collector, and the negative electrode film layer comprises a negative electrode active material; at least part of surface of the water-based positive electrode plate is provided with a plurality of first micropores, and satisfies: $0.001\% \leq (S_{12} \times H_{12} \times D_1)/(S_{11} \times C_1 \times H_{11}) \leq 1\%$, wherein $H_{11}$ represents a numerical value for the thickness of the water-based positive electrode plate in μm, $H_{12}$ represents a numerical value for a depth of the first micropores in μm, $S_{11}$ represents a numerical value for the area of the water-based positive electrode plate in $m^2$, $S_{12}$ represents a numerical value for a total area of the plurality of first micropores in $m^2$, $C_1$ represents a numerical value for a compaction density of the water-based positive electrode plate in g/cc, $D_1$ represents a numerical value for a volume average particle diameter Dv50 of the positive electrode active material in μm; at least part of surface of the negative electrode plate is provided with a plurality of second micropores, and satisfies: $0 < (S_{22} \times H_{22} \times D_2)/(S_{21} \times C_2 \times H_{21}) \leq 2.5\%$, wherein $H_{21}$ represents a numerical value for the thickness of the negative electrode plate in μm, $H_{22}$ represents a numerical value for a depth of the second micropores in μm, $S_{21}$ represents a numerical value for the area of the negative electrode plate in $m^2$, $S_{22}$ represents a numerical value for a total area of the plurality of second micropores in $m^2$, $C_2$ represents a numerical value for a compaction density of the negative electrode plate in g/cc, $D_2$ represents a numerical value for a volume average particle diameter Dv50 of the negative electrode active material in μm.

In the electrode assembly of the present application, by using a water-based positive electrode plate satisfying $0.001\% \leq (S_{12} \times H_{12} \times D_1)/(S_{11} \times C_1 \times H_{11}) \leq 1\%$ and a negative electrode plate satisfying $0 < (S_{22} \times H_{22} \times D_2)/(S_{21} \times C_2 \times H_{21}) \leq 2.5\%$, the electrode assembly can have low water content, high infiltration rate of electrolyte and high drying rate, and when used in secondary batteries, the electrode assembly can enable secondary batteries to have characteristics of high energy density, good cycle performance, low internal resistance, low cost and environmental friendliness.

In any embodiment of the present application, $0.05\% \leq (S_{12} \times H_{12} \times D_1)/(S_{11} \times C_1 \times H_{11}) \leq 0.5\%$; optionally, $0.15\% \leq (S_{12} \times H_{12} \times D_1)/(S_{11} \times C_1 \times H_{11}) \leq 0.25\%$.

By using $(S_{12} \times H_{12} \times D_1)/(S_{11} \times C_1 \times H_{11})$ within the above ranges, the electrode assembly can have low surface impedance and good interfacial properties, so that the secondary battery using the electrode assembly can have good electrochemical performance, such as high cycle stability, high capacity exertion and low internal resistance. In addition, $(S_{12} \times H_{12} \times D_1)/(S_{11} \times C_1 \times H_{11})$ within the above range can further enable the water-based positive electrode plate to maintain good mechanical properties.

In any embodiment of the present application, $0.2\% \leq (S_{22} \times H_{22} \times D_2)/(S_{21} \times C_2 \times H_{21}) \leq 2.0\%$; optionally, $0.4\% \leq (S_{22} \times H_{22} \times D_2)/(S_{21} \times C_2 \times H_{21}) \leq 1.0\%$.

By using $(S_{22} \times H_{22} \times D_2)/(S_{21} \times C_2 \times H_{21})$ within the above ranges, the negative electrode plate can not only have a high infiltration rate of electrolyte, but also have low surface impedance and good interfacial properties. Therefore, the secondary battery using the electrode assembly of the present application can have high cycle stability, high capacity exertion and low internal resistance. In addition, $(S_{22} \times H_{22} \times D_2)/(S_{21} \times C_2 \times H_{21})$ within the above ranges can further enable the negative electrode plate to maintain good mechanical properties.

In any embodiment of the present application, $0 < S_{12}/S_{11} \leq 2\%$, optionally, $0.4\% \leq S_{12}/S_{11} \leq 0.6\%$.

By using the ratio of the total area of the plurality of first micropores to the area of the water-based positive electrode plate within the above ranges, the water-based positive electrode plate can not only have good mechanical performance, but also have a suitable porosity, thus is beneficial to the water discharge and the infiltration of the electrolyte, and in addition, the water-based positive electrode plate can also have suitable electron conduction channels and active ion transmission channels.

In any embodiment of the present application, 30%≤$H_{12}$/$H_{11}$≤100%, optionally 60%≤$H_{12}$/$H_{11}$≤100%.

By using the ratio of the depth of the first micropores to the thickness of the water-based positive electrode plate within the above ranges, it can not only ensure that the water-based positive electrode plate has a high drying rate and high infiltration rate of electrolyte, but also ensure that the water-based positive electrode plate has good mechanical performance.

In any embodiment of the present application, $C_1$ is from 2.0 to 3.0, optionally from 2.3 to 2.7.

By controlling the compaction density of the water-based positive electrode plate within an appropriate range, the positive electrode active material particles in the positive electrode film layer can be in close contact, which increases the content of the positive electrode active material per unit volume and thus increases the energy density of the secondary battery.

In any embodiment of the present application, $D_1$ is from 0.5 to 1.5, optionally from 0.8 to 1.3.

By using the volume average particle diameter Dv50 of the positive electrode active material within the above ranges, the diffusion path of active ions can be shortened, thereby further improving the energy density, cycle performance and rate performance of the secondary battery.

In any embodiment of the present application, 0<$S_{22}$/$S_{21}$≤0.2%, optionally, 0.04%≤$S_{22}$/$S_{21}$≤0.06%.

By using the ratio of the total area of the plurality of second micropores to the area of the negative electrode plate within the above ranges, the negative electrode plate can not only have good mechanical performance, but also have a suitable porosity and high capacity, thus is beneficial to increasing the infiltration rate of the electrolyte and capacity exertion, and in addition, the negative electrode plate can also have suitable electron conduction channels and active ion transmission channels.

In any embodiment of the present application, 30%≤$H_{22}$/$H_{21}$≤100%, optionally 60%≤$H_{22}$/$H_{21}$≤100%.

By using the ratio of the depth of the second micropores to the thickness of the negative electrode plate within the above ranges, it can not only ensure that the negative electrode plate has high infiltration rate of electrolyte, but also ensure that the negative electrode plate has good mechanical performance.

In any embodiment of the present application, $C_2$ is from 1.2 to 2.0, optionally from 1.4 to 1.8.

By controlling the compaction density of the negative electrode plate within an appropriate range, the negative electrode active material particles in the negative electrode film layer can be in close contact, which increases the content of the negative electrode active material per unit volume and thus increases the energy density of the secondary battery.

In any embodiment of the present application, $D_2$ is from 12 to 20, optionally from 15 to 19.

By using the volume average particle diameter Dv50 of the negative electrode active material within the above ranges, the diffusion path of active ions can be shortened, thereby further improving the energy density, cycle performance and rate performance of the secondary battery.

In any embodiment of the present application, the electrode assembly satisfies: 0.1≤A/B≤1.0, optionally, 0.25≤A/B≤0.50, A represents $(S_{12} \times H_{12} \times D_1)/(S_{11} \times C_1 \times H_{11})$, B represents $(S_{22} \times H_{22} \times D_2)/(S_{21} \times C_2 \times H_{21})$.

The value of A/B within the above ranges can further increase the infiltration rate of electrolyte of the electrode assembly, and is more beneficial to the rapid discharge of residual water in the electrode assembly during drying, thereby enabling the secondary battery to have low impedance, high energy density and high cycle capacity retention.

In any embodiment of the present application, the electrode assembly satisfies: 0<$S_3$/$S_{22}$≤5%, optionally, 8%≤$S_3$/$S_{22}$≤70%, wherein $S_3$ represents a numerical value for an overlapping area of the plurality of first micropores and the plurality of second micropores in m².

The overlapping area of the first micropores on the surface of the water-based positive electrode plate and the second micropores on the surface of the negative electrode plate within the above ranges is beneficial to the formation of channels by the first micropores, the second micropores and micropores in the separator, and thus is beneficial to quick discharge of the residual water in the electrode assembly and improvement of the electrolyte infiltration rate of the electrode assembly. Therefore, the application of the electrode assembly of the present disclosure to a secondary battery can enable the secondary battery to have low impedance, high energy density and high cycle capacity retention.

In any embodiment of the present application, each of first micropores may have regular or irregular shape, optionally, each of first micropores may have a circle, rectangle or square shape.

In any embodiment of the present application, each of first micropores may have an equivalent diameter of from 1 μm to 200 μm, optionally from 50 μm to 180 μm.

The equivalent diameter of the first micropores within the above ranges can enable the water-based positive electrode plate to have good mechanical properties such as relatively high strength and good flexibility, under the premise of ensuring that the water-based positive electrode plate has low water content, high infiltration rate of electrolyte and high drying rate. Therefore, the electrode assembly can have a high infiltration rate of electrolyte and good processing performance, and thus a secondary battery using the electrode assembly can also have good electrochemical performance and high productivity.

In any embodiment of the present application, the center-to-center distance between adjacent first micropores is from 1 mm to 10 mm.

The center-to-center distance between adjacent first micropores within the above range can result in proper distribution of the first micropores on the surface of the water-based positive electrode plate. Thus, too dense distribution of the first micropores can be avoided, thus the water-based positive electrode plate maintains good mechanical properties.

In any embodiment of the present application, the plurality of first micropores are distributed in an array or arrays.

In any embodiment of the present application, each of second micropores may have regular or irregular shape, optionally, each of second micropores may have a circle, rectangle or square shape.

In any embodiment of the present application, each of second micropores may have an equivalent diameter of from 1 μm to 200 μm, optionally from 50 μm to 150 μm.

The equivalent diameter of the second micropores within the above ranges can enable the negative electrode plate to have good mechanical properties such as relatively high strength and good flexibility, under the premise of ensuring that the negative electrode plate has high infiltration rate of electrolyte. Therefore, the electrode assembly can have a high infiltration rate of electrolyte and good processing performance, and thus a secondary battery using the electrode assembly can also have good electrochemical performance and high productivity.

In any embodiment of the present application, the center-to-center distance between adjacent second micropores is from 1 mm to 10 mm.

The center-to-center distance between adjacent second micropores within the above range can result in proper distribution of the second micropores on the surface of the negative electrode plate. Thus, too dense distribution of the second micropores can be avoided, thus the negative electrode plate maintains good mechanical properties.

In any embodiment of the present application, the plurality of second micropores are distributed in an array or arrays.

In any embodiment of the present application, the positive electrode film layer further comprises one or more of a water-based binder and a conductive agent.

In any embodiment of the present application, the water-based binder comprises methylcellulose and salts thereof, xanthan gum and salts thereof, chitosan and salts thereof, alginic acid and salts thereof, polyethyleneimine and salts thereof, polyacrylamide, acrylonitrile-acrylic acid copolymer and derivatives or mixtures thereof.

In any embodiment of the present application, the water-based binder comprises a compound mixture of xanthan gum and polyethyleneimine. Optionally, mass ratio of the xanthan gum to the polyethyleneimine is from 2:1 to 0.2:2.8. Optionally, the number average molecular weight of the xanthan gum is from 300000 to 2000000. Optionally, the polyethyleneimine has a number average molecular weight of from 2000 to 50000.

In any embodiment of the present application, the water-based binder comprises a compound mixture of acrylonitrile-acrylic acid copolymer and polyethyleneimine. Optionally, mass ratio of the acrylonitrile-acrylic acid copolymer to the polyethyleneimine is from 2:1 to 0.2:2.8. Optionally, the acrylonitrile-acrylic acid copolymer has a number average molecular weight of from 300000 to 2000000. Optionally, the polyethyleneimine has a number average molecular weight of from 2000 to 70000.

In any embodiment of the present application, the conductive agent may comprise one or more of conductive carbon black, superconducting carbon black, conductive graphite, acetylene black, Ketjen black, graphene, and carbon nanotubes.

A second aspect of the present application provides a secondary battery, comprising the electrode assembly of the first aspect of the present application.

A third aspect of the present application provides a battery module, comprising the secondary battery of the second aspect of the present application.

A fourth aspect of the present application provides a battery pack, comprising one of the secondary battery of the second aspect of the present application and the battery module of the third aspect.

A fifth aspect of the present application provides an electrical device, comprising at least one of the secondary battery of the second aspect of the present application, the battery module of the third aspect, and the battery pack of the fourth aspect.

The secondary battery of the present application has low water content, high infiltration rate of electrolyte and high drying rate, and the secondary battery of the present application also has the characteristics of high energy density, good cycle performance, low internal resistance, low cost and environmental friendliness. The battery module, battery pack, and electrical device of the present application comprises the secondary battery provided by the present application, and thus has at least the same advantages as the secondary battery.

DESCRIPTION OF THE DRAWINGS

In order to explain the technical solutions of the embodiments of the present application more clearly, the following will briefly introduce the drawings that need to be used in the embodiments of the present application. Apparently, the drawings described below are only some embodiments of the present application. A person of ordinary skill in the art can obtain other drawings based on the accompanying drawings without creative work.

Figure 1:
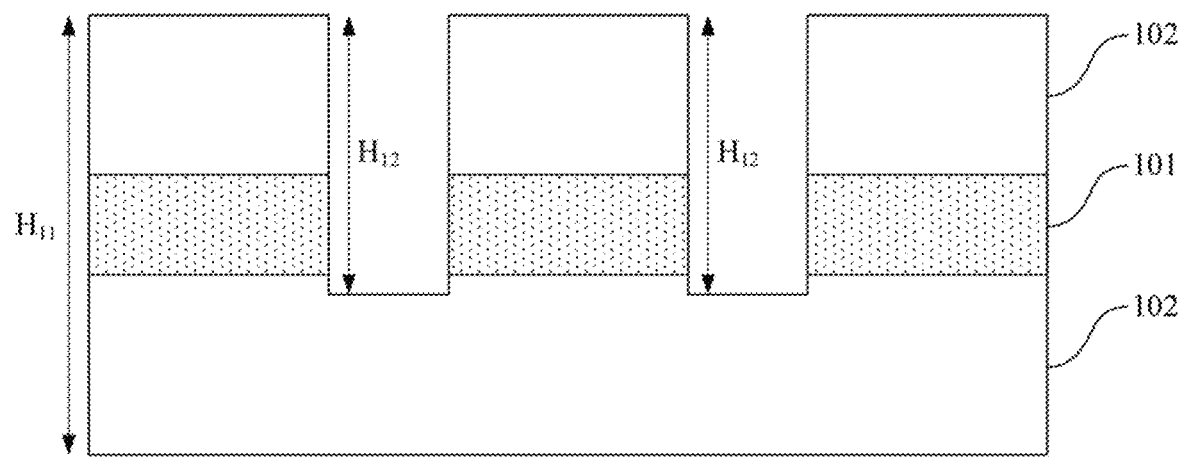
FIG. 1 is a schematic diagram of a water-based positive electrode plate according to an embodiment of the present application.

In the drawings, the accompanying drawings are not necessarily drawn to an actual scale. In the drawings, the reference sings in the accompanying drawings are illustrated as follows: 101—positive electrode current collector, 102—positive electrode film layer, 1—battery pack, 2—upper case, 3—lower case, 4—battery module, 5—secondary battery, 51—housing, 52—electrode assembly, and 53—cover plate.

DETAILED DESCRIPTION

Hereinafter, embodiments that specifically disclose the electrode assembly, the secondary battery comprising the same, the battery module, the battery pack, and the electrical device of the present application will be described in detail with reference to the accompanying drawings as appropriate. However, unnecessary detailed description may be omitted. For example, detailed descriptions of well-known items and repeated descriptions of substantially the same structures may be omitted. This is to avoid the following description from becoming unnecessarily lengthy and to facilitate the understanding of those skilled in the art. In addition, the drawings and the following description are provided for those skilled in the art to fully understand the present application, and are not intended to limit the subject matter described in the claims.

The "range(s)" disclosed in this application is/are defined in the form of lower and upper limits, and a given range is defined by selection of a lower limit and an upper limit that define boundary of the particular range. Ranges defined in this manner may or may not be inclusive of the endpoints, and may be arbitrarily combined. That is, any lower limit may be combined with any upper limit to form a range. For example, if the ranges of 60-120 and 80-110 are listed for a particular parameter, it is to be understood that the ranges of 60-110 and 80-120 are also contemplated. Additionally, if the minimum range values 1 and 2 are listed, and the maximum range values 3, 4, and 5 are listed, the following ranges are all expected: 1-3, 1-4, 1-5, 2-3, 2-4 and 2-5. In the present application, unless stated otherwise, the numerical range "a-b" represents an abbreviated representation of any combination of real numbers between a and b, where both a and b are real numbers. For example, the numerical range "0-5" means that all real numbers between "0-5" have been listed herein, and the range "0-5" is just an abbreviated representation of the combination of these numerical values. In addition, when a parameter is expressed as an integer greater than or equal to 2, it is equivalent to disclose that the parameter is, for example, an integer of 2, 3, 4, 5, 6, 7, 8, 9, 10, 11, 12, and the like.

Unless stated otherwise, all the embodiments and the optional embodiments of the present application can be combined with each other to form a new technical solution, and such technical solution should be considered to be included in the disclosure of the present application.

Unless stated otherwise, all technical features and optional technical features of the present application can be combined with each other to form a new technical solution, and such technical solution should be considered to be included in the disclosure of the present application.

Unless stated otherwise, all steps of the present application can be carried out sequentially, and also can be carried out randomly, in some embodiments they are carried out sequentially. For example, the method includes steps (a) and (b), indicating that the method may include steps (a) and (b) performed in sequence, or that the method may include steps (b) and (a) performed in sequence. For example, reference to the method further comprising step (c) indicates that step (c) may be added to the method in any order. As an example, the method may comprises steps (a), (b) and (c), steps (a), (c) and (b), or steps (c), (a) and (b), and the like.

Unless stated otherwise, the transitional phases "comprise", "comprising", "contain" and "containing" mentioned in the present application mean that it is drafted in an open mode. For example, the transitional phases "comprise", "comprising", "contain" and "containing" may mean that other components not listed may or may not also be included or contained.

In the present application herein, unless otherwise stated, the term "or" is inclusive. For example, the phrase "A or B" means "A, B, or both A and B". More specifically, any of the following conditions satisfy the condition "A or B": A is true (or exists) and B is false (or does not exist); A is false (or does not exist) and B is true (or exists); or both A and B are true (or exist). In this disclosure, the phrases "at least one of A, B, and C" and "at least one of A, B, or C" both mean only A, only B, only C, or any combination of A, B, and C.

Unless otherwise specified, in this application, the terms "first", "second" and so on are used to distinguish different objects, rather than to describe a specific sequence or primary-subordinate relationship.

In this application, the term "about" is used to describe and illustrate small variations, and when used in conjunction with a numerical value, the term can refer to a range of variation of less than or equal to ±10% of the stated numerical value.

In the description herein, unless otherwise stated, a numeric range described with the term "above" or "below" includes the lower or upper limit itself.

In the description of the present application, unless otherwise specified, the expressions "plurality of", "multiple", and "several" mean two or more.

With the application and promotion of secondary batteries, their cost and environmental pollution issues are receiving more and more attention. The water-based positive electrode slurry using water as solvent is attracting more and more attention from researchers due to its low cost and environmental friendliness. However, the inventors have found through research that the water-based positive electrode slurry often uses a binder with hydrophilic groups, and these hydrophilic groups and solvent water will have a relatively great impact on the performance of the secondary battery. Water-based positive electrode plate prepared using water-based positive electrode slurry will have some residual water which is difficult to be removed during drying. Therefore, when the existing water-based positive electrode plate is applied in a secondary battery, the residual water will not only affect the infiltration of the positive electrode plate, but also lead to side reactions such as with the electrolyte and electrode active materials inside the battery, which results in an increase in the irreversible loss of active ions, a decrease in the energy density of the battery, and too rapid capacity decay. In addition, it can also cause gas swelling and an increased self-discharge of battery.

Currently, in most related technologies, the water content of the water-based positive electrode plate is reduced by adjusting the formula of the positive electrode slurry or the preparation process of the positive electrode plate. Among others, adjusting the formula of the positive electrode slurry, such as adding absolute ethanol to the water-based positive electrode slurry, can reduce the residual water content in the water-based positive electrode plate to a certain extent. However, after addition of ethanol to the water-based positive electrode slurry, the introduced active hydroxyl group will affect the interfacial performance of the secondary battery, such as causing lithium precipitation and interfacial black spots. As a result, not only the cycle performance of the secondary battery is reduced, but also a potential safety hazard is brought. Adjusting the preparation process of the positive electrode plate, such as controlling the solid content of the water-based positive electrode slurry and using a combination of hot coating, cold pressing and vacuum drying to prepare the positive electrode plate, can effectively accelerate the volatilization of water and reduce the residual water in the water-based positive electrode plate, however, it will correspondingly increase the preparation cost of the water-based positive electrode plate and reduce the productivity of secondary battery.

After in-depth thinking, from the view of the structure of the electrode assembly, the inventors have designed an electrode assembly which can not only have low water content, high infiltration rate of electrolyte and high drying rate, but also have high energy density, good cycle performance, low internal resistance, low cost and environmental friendliness.

Electrode Assembly

The first aspect of the present application provides an electrode assembly, comprising a water-based positive electrode plate and a negative electrode plate.

The water-based positive electrode plate comprises a positive electrode current collector and a positive electrode film layer located on at least one surface of the positive electrode current collector, and the positive electrode film layer comprises a positive electrode active material. At least part of surface of the water-based positive electrode plate is provided with a plurality of first micropores, and satisfies: $0.001\% \leq (S_{12} \times H_{12} \times D_1)/(S_{11} \times C_1 \times H_{11}) \leq 1\%$, wherein $H_{11}$ represents a numerical value for the thickness of the water-based positive electrode plate in μm, $H_{12}$ represents a numerical value for a depth of the first micropores in μm, $S_{11}$ represents a numerical value for the area of the water-based positive electrode plate in m², $S_{12}$ represents a numerical value for a total area of the plurality of first micropores in m², $C_1$ represents a numerical value for a compaction density of the water-based positive electrode plate in g/cc, $D_1$ represents a numerical value for a volume average particle diameter Dv50 of the positive electrode active material in μm.

The negative electrode plate comprises a negative electrode current collector and a negative electrode film layer located on at least one surface of the negative electrode current collector, and the negative electrode film layer comprises a negative electrode active material. At least part of surface of the negative electrode plate is provided with a plurality of second micropores, and satisfies: $0 < (S_{22} \times H_{22} \times D_2)/(S_{21} \times C_2 \times H_{21}) \leq 2.5\%$, wherein $H_{21}$ represents a numerical value for the thickness of the negative electrode plate in μm, $H_{22}$ represents a numerical value for a depth of the second micropores in μm, $S_{21}$ represents a numerical value for the area of the negative electrode plate in m², $S_{22}$ represents a numerical value for a total area of the plurality of second micropores in m², $C_2$ represents a numerical value for a compaction density of the negative electrode plate in g/cc, $D_2$ represents a numerical value for a volume average particle diameter Dv50 of the negative electrode active material in μm.

Without being limited by any theory or explanation, the inventors have unexpectedly found that by using at least part of surface of the water-based positive electrode plate provided with a plurality of first micropores and $(S_{12} \times H_{12} \times D_1)/(S_{11} \times C_1 \times H_{11})$ of the water-based positive electrode plate within the above range, it can be easy to remove the residual water in the water-based positive electrode plate, thereby improving the interfacial performance of the electrode assembly and reducing the risk of gas swelling, self-discharge and corrosion of the electrode assembly. In addition, by using the above-mentioned first micropores provided on the surface of the water-based positive electrode plate, on the one hand, the porosity of the positive electrode plate can be increased, which is beneficial to increasing the infiltration rate of the electrolyte, and on the other hand, diffusion distance of the lithium ion can be greatly shorten, thereby effectively reducing the mass transfer resistance of lithium ions and reducing the internal resistance of the battery. Therefore, when the electrode assembly of the present application is applied to a secondary battery, it can not only reduce the risk of gas swelling, self-discharge and corrosion of the secondary battery, but also improve the energy density, cycle performance and rate performance of the secondary battery.

In addition, without being limited by any theory or explanation, in the electrode assembly of the present application, by using at least part of the surface of the negative electrode plate provided with a plurality of second micropores and $(S_{22} \times H_{22} \times D_2)/(S_{21} \times C_2 \times H_{21})$ value of the negative electrode plate within the above range, it can further not only improve the lithium ion transmission capacity of the negative electrode plate and increase the infiltration rate of the electrolyte, but also be beneficial to the capacity exertion of the positive electrode active material. As a result, the secondary battery using the electrode assembly of the present application can have good electrochemical performance and high energy density.

Through researches, the inventors have found that when $(S_{12} \times H_{12} \times D_1)/(S_{11} \times C_1 \times H_{11})$ is less than 0.001%, at least one of the following situations is present in the water-based positive electrode plate: a smaller ratio $S_{12}/S_{11}$ of the total area of the plurality of first micropores to the area of the water-based positive electrode plate, a smaller ratio $H_{12}/H_{11}$ of the depth of the first micropores to the thickness of the water-based positive electrode plate, a smaller volume average particle size $D_1$ of the positive electrode active material, and a larger compaction density $C_1$ of the water-based positive electrode plate. As a result, the distance between the positive electrode active material particles is very small and the contact is relatively close, resulting in fewer active ion transmission channels, higher internal resistance of the secondary battery, and poor electrolyte infiltration performance, which is not beneficial to the capacity exertion of batteries. In addition, the water-based positive electrode plate has fewer water discharge channels, and the water is not easy to be quickly discharged during drying, resulting in high residual water content and a higher risk of gas swelling, self-discharge, and corrosion of secondary batteries.

Through researches, the inventors have found that when $(S_{12} \times H_{12} \times D_1)/(S_{11} \times C_1 \times H_{11})$ is greater than 1%, at least one of the following situations is present in the water-based positive electrode plate: a higher ratio $S_{12}/S_{11}$ of the total area of the plurality of first micropores to the area of the water-based positive electrode plate, a higher ratio $H_{12}/H_{11}$ of the depth of the first micropores to the thickness of the water-based positive electrode plate, a higher volume average particle size $D_1$ of the positive electrode active material, a smaller compaction density $C_1$ of the water-based positive electrode plate. As a result, the energy density of secondary batteries is significantly reduced.

Through researches, the inventors have found that when $(S_{22} \times H_{22} \times D_2)/(S_{21} \times C_2 \times H_{21})$ is greater than 2.5%, at least one of the following situations is present in the negative electrode plate: a higher ratio $S_{22}/S_{21}$ of the total area of the plurality of second micropores to the area of the negative electrode plate, a higher ratio $H_{22}/H_{21}$ of the depth of the second micropores to the thickness of the negative electrode plate, a smaller volume average particle size $D_2$ of the negative electrode active material, and a smaller compaction density $C_2$ of the negative electrode plate. As a result, the energy density of secondary batteries is significantly reduced.

In the electrode assembly of the present application, by using a water-based positive electrode plate satisfying $0.001\% \leq (S_{12} \times H_{12} \times D_1)/(S_1 \times C_1 \times H_1) \leq 1\%$ and a negative electrode plate satisfying $0 < (S_{22} \times H_{22} \times D_2)/(S_{21} \times C_2 \times H_{21}) \leq 2.5\%$, the electrode assembly can have low water content, high infiltration rate of electrolyte and high drying rate, and when used in secondary batteries, the electrode assembly can enable secondary batteries to have characteristics of high energy density, good cycle performance, low internal resistance, low cost and environmental friendliness.

The possible reasons include: firstly, the surface of the water-based positive electrode plate and the negative electrode plate are provided with micropores, so during the assembly process of the secondary battery, the electrolyte may not only infiltrate the electrode assembly along the horizontal direction of the electrode/separator, but also along the vertical direction of the electrode plate through the network formed by the micropores of the electrode plate and the micropores of the separator; secondly, the surface of the water-based positive electrode plate and the negative electrode plate are provided with micropores, so the residual water in the electrode plate can be quickly discharged to the outside of the electrode assembly during drying of the electrode assembly, thereby further reducing the water content of the electrode assembly; thirdly, after a reasonable combination of micropores on the surfaces of the electrode plates, the compaction density of the electrode plates, and the particle size of the active material particles, it can ensure that both the water-based positive electrode plate and the negative electrode plate have a suitable electronic conduction channels and active ion transport channels at the same time.

In some embodiments, the water-based positive electrode plate may satisfy: $0.05\% \leq (S_{12} \times H_{12} \times D_1)/(S_{11} \times C_1 \times H_{11}) \leq 0.4\%$, $0.05\% \leq (S_{12} \times H_{12} \times D_1)/(S_{11} \times C_1 \times H_{11}) \leq 0.35\%$, $0.05\% \leq (S_{12} \times H_{12} \times D_1)/(S_{11} \times C_1 \times H_{11}) \leq 0.3\%$, $0.05\% \leq (S_{12} \times H_{12} \times D_1)/(S_{11} \times C_1 \times H_{11}) \leq 0.25\%$, $0.05\% \leq (S_{12} \times H_{12} \times D_1)/(S_{11} \times C_1 \times H_{11}) \leq 0.2\%$, $0.05\% \leq (S_{12} \times H_{12} \times D_1)/(S_{11} \times C_1 \times H_{11}) \leq 0.15\%$, $0.1\% \leq (S_{12} \times H_{12} \times D_1)/(S_{11} \times C_1 \times H_{11}) \leq 0.5\%$, $0.1\% \leq (S_{12} \times H_{12} \times D_1)/(S_{11} \times C_1 \times H_{11}) \leq 0.45\%$, $0.1\% \leq (S_{12} \times H_{12} \times D_1)/(S_{11} \times C_1 \times H_{11}) \leq 0.4\%$, $0.1\% \leq (S_{12} \times H_{12} \times D_1)/(S_{11} \times C_1 \times H_{11}) \leq 0.35\%$, $0.1\% \leq (S_{12} \times H_{12} \times D_1)/(S_{11} \times C_1 \times H_{11}) \leq 0.3\%$, $0.1\% \leq (S_{12} \times H_{12} \times D_1)/(S_{11} \times C_1 \times H_{11}) \leq 0.25\%$, $0.1\% \leq (S_{12} \times H_{12} \times D_1)/(S_{11} \times C_1 \times H_{11}) \leq 0.2\%$, $0.15\% \leq (S_{12} \times H_{12} \times D_1)/(S_{11} \times C_1 \times H_{11}) \leq 0.5\%$, $0.15\% \leq (S_{12} \times H_{12} \times D_1)/(S_{11} \times C_1 \times H_{11}) \leq 0.45\%$, $0.15\% \leq (S_{12} \times H_{12} \times D_1)/(S_{11} \times C_1 \times H_{11}) \leq 0.4\%$, $0.15\% \leq (S_{12} \times H_{12} \times D_1)/(S_{11} \times C_1 \times H_{11}) \leq 0.35\%$, $0.15\% \leq (S_{12} \times H_{12} \times D_1)/(S_{11} \times C_1 \times H_{11}) \leq 0.3\%$, $0.15\% \leq (S_{12} \times H_{12} \times D_1)/(S_{11} \times C_1 \times H_{11}) \leq 0.25\%$, $0.2\% \leq (S_{12} \times H_{12} \times D_1)/(S_{11} \times C_1 \times H_{11}) \leq 0.5\%$, $0.2\% \leq (S_{12} \times H_{12} \times D_1)/(S_{11} \times C_1 \times H_{11}) \leq 0.45\%$, $0.2\% \leq (S_{12} \times H_{12} \times D_1)/(S_{11} \times C_1 \times H_{11}) \leq 0.4\%$, $0.2\% \leq (S_{12} \times H_{12} \times D_1)/(S_{11} \times C_1 \times H_{11}) \leq 0.35\%$, $0.2\% \leq (S_{12} \times H_{12} \times D_1)/(S_{11} \times C_1 \times H_{11}) \leq 0.3\%$, $0.25\% \leq (S_{12} \times H_{12} \times D_1)/(S_{11} \times C_1 \times H_{11}) \leq 0.5\%$, $0.25\% \leq (S_{12} \times H_{12} \times D_1)/(S_{11} \times C_1 \times H_{11}) \leq 0.45\%$ or $0.25\% \leq (S_{12} \times H_{12} \times D_1)/(S_{11} \times C_1 \times H_{11}) \leq 0.4\%$.

Without being limited by any theory or explanation, through researches, the inventors have found that by using $(S_{12} \times H_{12} \times D_1)/(S_{11} \times C_1 \times H_{11})$ within the above ranges, the water in the water-based positive electrode plate can be quickly discharged to the outside of the electrode assembly during the drying process of the electrode assembly, thereby further reducing the water content of the positive electrode plate, and improving the infiltration rate of electrolyte and drying rate of the electrode assembly. As a result, the electrode assembly can have low surface impedance and good interfacial properties, so that the secondary battery using the electrode assembly can have good electrochemical performance, such as high cycle stability, high capacity exertion and low internal resistance. In addition, $(S_{12} \times H_{12} \times D_1)/(S_{11} \times C_1 \times H_{11})$ within the above ranges can further enable the water-based positive electrode plate to maintain good mechanical properties. Therefore, the positive electrode plate is less likely to be deformed during the assembly and processing of the electrode assembly. Therefore, the electrode assembly can not only maintain good electrochemical performance during processing and assembly, but also have high productivity.

In some embodiments, the negative electrode plate may satisfy: $0.2\% \leq (S_{22} \times H_{22} \times D_2)/(S_{21} \times C_2 \times H_{21}) \leq 2.0\%$, $0.2\% \leq (S_{22} \times H_{22} \times D_2)/(S_{21} \times C_2 \times H_{21}) \leq 1.8\%$, $0.2\% \leq (S_{22} \times H_{22} \times D_2)/(S_{21} \times C_2 \times H_{21}) \leq 1.5\%$, $0.2\% \leq (S_{22} \times H_{22} \times D_2)/(S_{21} \times C_2 \times H_{21}) \leq 1.2\%$, $0.2\% \leq (S_{22} \times H_{22} \times D_2)/(S_{21} \times C_2 \times H_{21}) \leq 1.0\%$, $0.2\% \leq (S_{22} \times H_{22} \times D_2)/(S_{21} \times C_2 \times H_{21}) \leq 0.8\%$, $0.2\% \leq (S_{22} \times H_{22} \times D_2)/(S_{21} \times C_2 \times H_{21}) \leq 0.5\%$, $0.3\% \leq (S_{22} \times H_{22} \times D_2)/(S_{21} \times C_2 \times H_{21}) \leq 2.0\%$, $0.3\% \leq (S_{22} \times H_{22} \times D_2)/(S_{21} \times C_2 \times H_{21}) \leq 1.8\%$, $0.3\% \leq (S_{22} \times H_{22} \times D_2)/(S_{21} \times C_2 \times H_{21}) \leq 1.5\%$, $0.3\% \leq (S_{22} \times H_{22} \times D_2)/(S_{21} \times C_2 \times H_{21}) \leq 1.2\%$, $0.3\% \leq (S_{22} \times H_{22} \times D_2)/(S_{21} \times C_2 \times H_{21}) \leq 1.0\%$, $0.3\% \leq (S_{22} \times H_{22} \times D_2)/(S_{21} \times C_2 \times H_{21}) \leq 0.8\%$, $0.3\% \leq (S_{22} \times H_{22} \times D_2)/(S_{21} \times C_2 \times H_{21}) \leq 0.5\%$, $0.4\% \leq (S_{22} \times H_{22} \times D_2)/(S_{21} \times C_2 \times H_{21}) \leq 2.0\%$, $0.4\% \leq (S_{22} \times H_{22} \times D_2)/(S_{21} \times C_2 \times H_{21}) \leq 1.8\%$, $0.4\% \leq (S_{22} \times H_{22} \times D_2)/(S_{21} \times C_2 \times H_{21}) \leq 1.5\%$, $0.4\% \leq (S_{22} \times H_{22} \times D_2)/(S_{21} \times C_2 \times H_{21}) \leq 1.2\%$, $0.4\% \leq (S_{22} \times H_{22} \times D_2)/(S_{21} \times C_2 \times H_{21}) \leq 1.0\%$, $0.4\% \leq (S_{22} \times H_{22} \times D_2)/(S_{21} \times C_2 \times H_{21}) \leq 0.8\%$, $0.5\% \leq (S_{22} \times H_{22} \times D_2)/(S_{21} \times C_2 \times H_{21}) \leq 2.0\%$, $0.5\% \leq (S_{22} \times H_{22} \times D_2)/(S_{21} \times C_2 \times H_{21}) \leq 1.8\%$, $0.5\% \leq (S_{22} \times H_{22} \times D_2)/(S_{21} \times C_2 \times H_{21}) \leq 1.5\%$, $0.5\% \leq (S_{22} \times H_{22} \times D_2)/(S_{21} \times C_2 \times H_{21}) \leq 1.2\%$, $0.5\% \leq (S_{22} \times H_{22} \times D_2)/(S_{21} \times C_2 \times H_{21}) \leq 1.0\%$ or $0.5\% \leq (S_{22} \times H_{22} \times D_2)/(S_{21} \times C_2 \times H_{21}) \leq 0.8\%$.

Without being limited by any theory or explanation, through researches, the inventors have found that by using $(S_{22} \times H_{22} \times D_2)/(S_{21} \times C_2 \times H_{21})$ within the above ranges, the negative electrode plate can not only have a high infiltration rate of electrolyte, but also have low surface impedance and good interfacial properties. Therefore, the secondary battery using the electrode assembly of the present application can have high cycle stability, high capacity exertion and low internal resistance. In addition, $(S_{22} \times H_{22} \times D_2)/(S_{21} \times C_2 \times H_{21})$ within the above ranges can further enable the negative electrode plate to maintain good mechanical properties. Therefore, the negative electrode plate is less likely to be deformed during the assembly and processing of the electrode assembly. Therefore, the electrode assembly can not only maintain good electrochemical performance during processing and assembly, but also have high productivity.

In some embodiments, the ratio of the total area of the plurality of first micropores to the area of the water-based positive electrode plate satisfies $0 < S_{12}/S_1 \leq 2\%$. For example, $0.1\% \leq S_{12}/S_{11} \leq 2\%$, $0.1\% \leq S_{12}/S_{11} \leq 1.8\%$, $0.1\% \leq S_{12}/S_{11} \leq 1.5\%$, $0.1\% \leq S_{12}/S_{11} \leq 1.2\%$, $0.1\% \leq S_{12}/S_{11} \leq 1\%$, $0.1\% \leq S_{12}/S_{11} \leq 0.8\%$, $0.1\% \leq S_{12}/S_{11} \leq 0.6\%$, $0.2\% \leq S_{12}/S_{11} \leq 2\%$, $0.2\% \leq S_{12}/S_{11} \leq 1.8\%$, $0.2\% \leq S_{12}/S_{11} \leq 1.5\%$, $0.2\% \leq S_{12}/S_{11} \leq 1.2\%$, $0.2\% \leq S_{12}/S_{11} \leq 1\%$, $0.2\% \leq S_{12}/S_{11} \leq 0.8\%$, $0.2\% \leq S_{12}/S_{11} \leq 0.6\%$, $0.3\% \leq S_{12}/S_{11} \leq 2\%$, $0.3\% \leq S_{12}/S_{11} \leq 1.8\%$, $0.3\% \leq S_{12}/S_{11} \leq 1.5\%$, $0.3\% \leq S_{12}/S_{11} \leq 1.2\%$, $0.3\% \leq S_{12}/S_{11} \leq 1\%$, $0.3\% \leq S_{12}/S_{11} \leq 0.8\%$, $0.3\% \leq S_{12}/S_{11} \leq 0.6\%$, $0.4\% \leq S_{12}/S_{11} \leq 2\%$, $0.4\% \leq S_{12}/S_{11} \leq 1.8\%$, $0.4\% \leq S_{12}/S_{11} \leq 1.5\%$, $0.4\% \leq S_{12}/S_{11} \leq 1.2\%$, $0.4\% \leq S_{12}/S_{11} \leq 1\%$, $0.4\% \leq S_{12}/S_{11} \leq 0.8\%$, $0.4\% \leq S_{12}/S_{11} \leq 0.6\%$, $0.5\% \leq S_{12}/S_{11} \leq 2\%$, $0.5\% \leq S_{12}/S_{11} \leq 1.8\%$, $0.5\% \leq S_{12}/S_{11} \leq 1.5\%$, $0.5\% \leq S_{12}/S_{11} \leq 1.2\%$, $0.5\% \leq S_{12}/S_{11} \leq 1\%$, $0.5\% \leq S_{12}/S_{11} \leq 0.8\%$ or $0.5\% \leq S_{12}/S_{11b \leq 0.6}\%$.

Without being limited by any theory or explanation, the ratio of the total area of the plurality of first micropores to the area of the water-based positive electrode plate within the above ranges can enable the water-based positive electrode plate to have good mechanical properties. As a result, the risk of irreversible deformation of the water-based positive electrode plate during processing can be reduced, thereby improving the productivity of the electrode assembly. By using the ratio of the total area of the plurality of first micropores to the area of the water-based positive electrode plate within the above ranges, the water-based positive electrode plate can also have a suitable porosity, thus is beneficial to the water discharge and the infiltration of the electrolyte. In addition, by using the ratio of the total area of the plurality of first micropores to the area of the water-based positive electrode plate within the above ranges, the water-based positive electrode plate can also have suitable electron conduction channels and active ion transmission channels. Therefore, the application of electrode assembly in secondary batteries can enable the secondary batteries to have high productivity, high cycle stability, high capacity exertion, and low internal resistance.

In some embodiments, the ratio of the depth of the first micropores to the thickness of the water-based positive electrode plate satisfies $30\% \leq H_{12}/H_{11} \leq 100\%$. For example, $30\% \leq H_{12}/H_{11} \leq 90\%$, $30\% \leq H_{12}/H_{11} \leq 80\%$, $30\% \leq H_{12}/H_{11} \leq 70\%$, $30\% \leq H_{12}/H_{11} \leq 60\%$, $30\% \leq H_{12}/H_{11} \leq 50\%$, $30\% \leq H_{12}/H_{11} \leq 40\%$, $40\% \leq H_{12}/H_{11} \leq 100\%$, $40\% \leq H_{12}/H_{11} \leq 90\%$, $40\% \leq H_{12}/H_{11} \leq 80\%$, $40\% \leq H_{12}/H_{11} \leq 70\%$, $40\% \leq H_{12}/H_{11} \leq 60\%$, $40\% \leq H_{12}/H_{11} \leq 50\%$, $50\% \leq H_{12}/H_{11} \leq 100\%$, $50\% \leq H_{12}/H_{11} \leq 90\%$, $50\% \leq H_{12}/H_{11} \leq 80\%$, $50\% \leq H_{12}/H_{11} \leq 70\%$, $50\% \leq H_{12}/H_{11} \leq 60\%$, $60\% \leq H_{12}/H_{11} \leq 100\%$, $60\% \leq H_{12}/H_{11} \leq 90\%$, $60\% \leq H_{12}/H_{11} \leq 80\%$, $60\% \leq H_{12}/H_{11} \leq 70\%$, $70\% \leq H_{12}/H_{11} \leq 100\%$, $70\% \leq H_{12}/H_{11} \leq 90\%$, $70\% \leq H_{12}/H_{11} \leq 80\%$, $80\% \leq H_{12}/H_{11} \leq 100\%$, $80\% \leq H_{12}/H_{11} \leq 90\%$ or $90\% \leq H_{12}/H_{11} \leq 100\%$.

In the present application, the depth of the first micropores may be less than or equal to the thickness of the water-based positive electrode plate. When $H_{12}/H_{11}$ is 100%, the first micropore can be a through hole penetrating through the positive electrode plate.

Without being limited by any theory or explanation, by using the ratio of the depth of the first micropores to the thickness of the water-based positive electrode plate within the above ranges, it can not only ensure that the water-based positive electrode plate has a high drying rate and high infiltration rate of electrolyte, but also ensure that the water-based positive electrode plate has good mechanical performance. Therefore, the electrode assembly of the present application can have good interfacial performance, low surface resistance and high processing efficiency, and when applied to secondary batteries, the electrode assembly can enable the secondary battery to have good cycle performance, good rate performance and high productivity.

$C_1$ represents the compaction density of the water-based positive electrode plate in g/cc. In some embodiments, $C_1$ may be from 2.0 to 3.0, for example, $C_1$ may be about 2.0, about 2.1, about 2.2, about 2.3, about 2.4, about 2.5, about 2.6, about 2.7, about 2.8, about 2.9, about 3.0 or within the ranges formed by any of the above values. In some embodiments of the present application, $C_1$ is optionally from 2.3 to 2.7.

By controlling the compaction density of the water-based positive electrode plate within the appropriate ranges, the positive electrode active material particles in the positive electrode film layer can be in close contact, which increases the content of the positive electrode active material per unit volume and thus increases the energy density of the secondary battery.

$D_1$ represents volume average particle diameter Dv50 of the positive electrode active material in μm. In some embodiments, $D_1$ may be from 0.5 to 1.5, for example, $D_1$ may be about 0.5, about 0.6, about 0.7, about 0.8, about 0.9, about 1.0, about 1.1, about 1.2, about 1.3, about 1.4, about 1.5 or within the ranges formed by any of the above values. In some embodiments of the present application, $D_1$ is optionally from 0.8 to 1.3.

By using the volume average particle diameter Dv50 of the positive electrode active material within the above ranges, the diffusion path of active ions can be shortened. Therefore, when the electrode assembly of the present application is applied to a secondary battery, it can further improve the energy density, cycle performance and rate performance of the secondary battery.

In addition, in the control electrode assembly, controlling the ratio $S_{12}/S_{11}$ of the total area of the plurality of first micropores to the area of the water-based positive electrode plate, the ratio $H_{12}/H_{11}$ of the depth of the first micropores to the thickness of the water-based positive electrode plate, the compaction density $C_1$ of the aqueous positive electrode plate, volume average particle size $D_1$ of positive electrode active material within the above ranges, can be beneficial to regulating $(S_{12} \times H_{12} \times D_1)/(S_{11} \times C_1 \times H_{11})$ within the ranges of this application. Therefore, when the electrode assembly of the present application is applied to a secondary battery, it can not only reduce the risk of gas swelling, self-discharge and corrosion of the secondary battery, but also improve the energy density, cycle performance and rate performance of the secondary battery.

In some embodiments, the ratio of the total area of the plurality of second micropores to the area of the negative electrode plate satisfies: $0 < S_{22}/S_{21} \leq 0.2\%$. For example, $0.02\% \leq S_{22}/S_{21} \leq 0.2\%$, $0.02\% \leq S_{22}/S_{21} \leq 0.18\%$, $0.02\% \leq S_{22}/S_{21} \leq 0.16\%$, $0.02\% \leq S_{22}/S_{21} \leq 0.14\%$, $0.02\% \leq S_{22}/S_{21} \leq 0.12\%$, $0.02\% \leq S_{22}/S_{21} \leq 0.1\%$, $0.02\% \leq S_2/S_{21} \leq 0.08\%$, $0.02\% \leq S_{22}/S_{21} \leq 0.06\%$, $0.02\% \leq S_{22}/S_{21} \leq 0.04\%$, $0.04\% \leq S_{22}/S_{21} \leq 0.2\%$, $0.04\% \leq S_{22}/S_{21} \leq 0.18\%$, $0.04\% \leq S_{22}/S_{21} \leq 0.16\%$, $0.04\% \leq S_{22}/S_{21} \leq 0.14\%$, $0.04\% \leq S_{22}/S_{21} \leq 0.12\%$, $0.04\% \leq S_{22}/S_{21} \leq 0.1\%$, $0.04\% \leq S_{22}/S_{21} \leq 0.08\%$, $0.04\% \leq S_{22}/S_{21} \leq 0.06\%$, $0.06\% \leq S_{22}/S_{21} \leq 0.2\%$, $0.06\% \leq S_{22}/S_{21} \leq 0.18\%$, $0.06\% \leq S_{22}/S_{21} \leq 0.16\%$, $0.06\% \leq S_{22}/S_{21} \leq 0.14\%$, $0.06\% \leq S_{22}/S_{21} \leq 0.12\%$, $0.06\% \leq S_{22}/S_{21} \leq 0.1\%$ or $0.06\% \leq S_{22}/S_{21} \leq 0.08\%$.

Without being limited by any theory or explanation, the ratio of the total area of the plurality of second micropores to the area of the negative electrode plate within the above ranges can enable the negative electrode plate to have good mechanical properties. As a result, the risk of irreversible deformation of the negative electrode plate during processing can be reduced, thereby improving the productivity of the electrode assembly. By using the ratio of the total area of the plurality of second micropores to the area of the negative electrode plate within the above ranges, the negative electrode plate can further have a suitable porosity and high capacity, thus is beneficial to increasing the infiltration rate of the electrolyte and capacity exertion. In addition, by using the ratio of the total area of the plurality of second micropores to the area of the negative electrode plate within the above ranges, the negative electrode plate can further have suitable electron conduction channels and active ion transmission channels. Therefore, the application of electrode assembly in secondary batteries can enable the secondary batteries to have high productivity, high cycle stability, high capacity exertion, and low internal resistance.

In some embodiments, the ratio of the depth of the second micropores to the thickness of the negative electrode plate may satisfy: $30\% \leq H_{22}/H_{21} \leq 100\%$, $30\% \leq H_{22}/H_{21} \leq 90\%$, $30\% \leq H_{22}/H_{21} \leq 80\%$, $30\% \leq H_{22}/H_{21} \leq 70\%$, $30\% \leq H_{22}/H_{21} \leq 60\%$, $40\% \leq H_{22}/H_{21} \leq 100\%$, $40\% \leq H_{22}/H_{21} \leq 90\%$, $40\% \leq H_{22}/H_{21} \leq 80\%$, $40\% \leq H_{22}/H_{21} \leq 70\%$, $40\% \leq H_{22}/H_{21} \leq 60\%$, $50\% \leq H_{22}/H_{21} \leq 100\%$, $50\% \leq H_{22}/H_{21} \leq 90\%$, $50\% \leq H_{22}/H_{21} \leq 80\%$, $50\% \leq H_{22}/H_{21} \leq 70\%$, $60\% \leq H_{22}/H_{21} \leq 100\%$, $60\% \leq H_{22}/H_{21} \leq 90\%$, $60\% \leq H_{22}/H_{21} \leq 80\%$, $70\% \leq H_{22}/H_{21} \leq 100\%$, $70\% \leq H_{22}/H_{21} \leq 90\%$, $70\% \leq H_{22}/H_{21} \leq 80\%$, $80\% \leq H_{22}/H_{21} \leq 100\%$, $80\% \leq H_{22}/H_{21} \leq 90\%$ or $90\% \leq H_{22}/H_{21} \leq 100\%$.

In the present application, the depth of the second micropores may be less than or equal to the thickness of the negative electrode plate. When $H_{22}/H_{21}$ is 100%, the second micropore can be a through hole penetrating through the negative electrode plate.

Without being limited by any theory or explanation, by using the ratio of the depth of the second micropores to the thickness of the negative electrode plate within the above ranges, it can not only ensure that the negative electrode plate has a high infiltration rate of electrolyte, but also ensure that the negative electrode plate has good mechanical performance. Therefore, the electrode assembly of the present application can have good interfacial performance, low surface resistance and high processing efficiency, and when applied to secondary batteries, the electrode assembly can enable the secondary battery to have good cycle performance, good rate performance and high productivity.

$C_2$ represents compaction density of the negative electrode plate in g/cc. In some embodiments, $C_2$ may be from 1.2 to 2.0, for example, $C_2$ may be about 1.2, about 1.3, about 1.4, about 1.5, about 1.6, about 1.7, about 1.8, about 1.9, about 2.0, or within the ranges formed by any of the above values. In some embodiments of the present application, $C_2$ is optionally from 1.4 to 1.8.

By controlling the compaction density of the negative electrode plate within an appropriate range, the negative electrode active material particles in the negative electrode film layer can be in close contact, which increases the content of the negative electrode active material per unit volume and thus increases the energy density of the secondary battery.

$D_2$ represents volume average particle diameter Dv50 of the negative electrode active material in μm. In some embodiments, $D_2$ may be from 12 to 20, for example, $D_2$ may be about 12, about 13, about 14, about 15, about 16, about 17, about 18, about 19, about 20, or within the ranges formed by any of the above values. In some embodiments of the present application, $D_2$ is optionally from 15 to 19.

By using the volume average particle diameter Dv50 of the negative electrode active material within the above ranges, the diffusion path of active ions can be shortened. Therefore, when the electrode assembly of the present application is applied to a secondary battery, it can further improve the energy density, cycle performance and rate performance of the secondary battery.

In addition, in the control electrode assembly, controlling the ratio $S_{22}/S_{21}$ of the total area of the plurality of second micropores to the area of the negative electrode plate, the ratio $H_{22}/H_{21}$ of the depth of the second micropores to the thickness of the negative electrode plate, the compaction density $C_2$ of the negative electrode plate, volume average particle size $D_2$ of negative electrode active material within the above ranges, can be beneficial to regulating $(S_{22} \times H_{22} \times D_2)/(S_{21} \times C_2 \times H_{21})$ within the ranges of this application. Therefore, the application of the electrode assembly of the present disclosure to a secondary battery can enable the secondary battery to have good electrochemical performance and high energy density.

In some embodiments, the electrode component can satisfies: $0.1 \leq A/B \leq 1.0$, A represents $(S_{12} \times H_{12} \times D_1)/(S_1 \times C_1 \times H_{11})$, B represents $(S_{22} \times H_{22} \times D_2)/(S_{21} \times C_2 \times H_{21})$. For example, $0.10 \leq A/B \leq 0.75$, $0.10 \leq A/B \leq 0.50$, $0.10 \leq A/B \leq 0.50$, $0.10 \leq A/B \leq 0.25$, $0.15 \leq A/B \leq 1.0$, $0.15 \leq A/B \leq 0.75$, $0.15 \leq A/B \leq 0.50$, $0.15 \leq A/B \leq 0.25$, $0.20 \leq A/B \leq 1.0$, $0.20 \leq A/B \leq 0.75$, $0.20 \leq A/B \leq 0.50$, $0.20 \leq A/B \leq 0.25$, $0.25 \leq A/B \leq 1.0$, $0.25 \leq A/B \leq 0.75$, $0.25 \leq A/B \leq 0.50$, $0.30 \leq A/B \leq 1.0$, $0.30 \leq A/B \leq 0.75$, $0.30 \leq A/B \leq 0.50$, $0.35 \leq A/B \leq 1.0$, $0.35 \leq A/B \leq 0.75$, $0.35 \leq A/B \leq 0.50$, $0.40 \leq A/B \leq 1.0$, $0.40 \leq A/B \leq 0.75$ or $0.40 \leq A/B \leq 0.50$.

Without being limited by any theory or explanation, the value of A/B within the above ranges can fully exert the respective advantages of the water-based positive electrode plate and negative electrode plate and the synergistic effect between the two, thus can further increase the infiltration rate of electrolyte of the electrode assembly, and is more beneficial to the rapid discharge of residual water in the electrode assembly during drying. Therefore, the application of the electrode assembly of the present disclosure to a secondary battery can enable the secondary battery to have low impedance, high energy density and high cycle capacity retention.

In some embodiments, the electrode assembly can satisfy: $S_3/S_{22} \geq 5\%$, for example, $S_3/S_{22}$ may be about 5%, about 8%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 100%, or within the ranges formed by any of the above values. $S_3$ represents a numerical value for an overlapping area of the plurality of first micropores and the plurality of second micropores in $m^2$.

In some embodiments, the electrode assembly may satisfy: $8\% \leq S_3/S_{22} \leq 85\%$, $8\% \leq S_3/S_{22} \leq 80\%$, $8\% \leq S_3/S_{22} \leq 75\%$, $8\% \leq S_3/S_{22} \leq 70\%$, $15\% \leq S_3/S_{22} \leq 85\%$, $15\% \leq S_3/S_{22} \leq 80\%$, $15\% \leq S_3/S_{22} \leq 75\%$, $15\% \leq S_3/S_{22} \leq 70\%$, $25\% \leq S_3/S_{22} \leq 85\%$, $25\% \leq S_3/S_{22} \leq 80\%$, $25\% \leq S_3/S_{22} \leq 75\%$, $25\% \leq S_3/S_{22} \leq 70\%$, $40\% \leq S_3/S_{22} \leq 85\%$, $40\% \leq S_3/S_{22} \leq 80\%$, $40\% \leq S_3/S_{22} \leq 75\%$ or $40\% \leq S_3/S_{22} \leq 70\%$.

Without being limited by any theory or explanation, the overlapping area of the first micropores on the surface of the water-based positive electrode plate and the second micropores on the surface of the negative electrode plate within the above ranges is beneficial to the formation of channels by the first micropores, the second micropores and micropores in the separator, and thus is beneficial to quick discharge of the residual water in the electrode assembly and improvement of the electrolyte infiltration rate of the electrode assembly. Therefore, the application of the electrode assembly of the present disclosure to a secondary battery can enable the secondary battery to have low impedance, high energy density and high cycle capacity retention.

In the present application, the shape of the first micropores is not limited, and the shapes of the first micropores may be the same or different. In some embodiments, each of first micropores may have regular or irregular shape. In some embodiments, each of first micropores may have a circle, rectangle or square shape.

In some embodiments, the equivalent diameter of each of first micropores may be from 1 μm to 200 μm, for example, it may be about 5 μm, about 10 μm, about 20 μm, about 50 μm, about 80 μm, about 100 μm, about 120 μm, about 150 μm, about 180 μm, about 200 μm or within the range formed by any of the above values. In some embodiments, the equivalent diameter of each of first micropores may be from 5 μm to 180 μm, from 10 μm to 180 μm, from 20 μm to 180 μm, from 30 μm to 180 μm, from 50 μm to 180 μm, from 5 μm to 150 μm, from 10 μm to 150 μm, from 20 μm to 150 μm, from 30 μm to 150 μm or from 50 μm to 150 μm.

The equivalent diameter of each of first micropores may be a diameter of a circle having an area equal to that of each of first micropores. The equivalent diameter of the first micropores within the above ranges can enable the water-based positive electrode plate to have good mechanical properties such as relatively high strength and good flexibility, under the premise of ensuring that the water-based positive electrode plate has low water content, high infiltration rate of electrolyte and high drying rate. Therefore, the electrode assembly can have a high infiltration rate of electrolyte and good processing performance, and thus a secondary battery using the electrode assembly can also have good electrochemical performance and high productivity.

In some embodiments, the center-to-center distance between adjacent first micropores may be from 1 mm to 10 mm, such as may be about 1 mm, about 2 mm, about 3 mm, about 4 mm, about 5 mm, about 6 mm, about 7 mm, about 8 mm, about 9 mm, about 10 mm, or within the ranges formed by any of the above values.

Without being limited by any theory or explanation, the center-to-center distance between adjacent first micropores within the above ranges can result in proper distribution of the first micropores on the surface of the water-based positive electrode plate. Thus, too dense distribution of the first micropores can be avoided, thus the water-based positive electrode plate maintains good mechanical properties.

In the present application, the distribution form of the plurality of first micropores is not limited. In some embodiments, the plurality of first micropores may be distributed in an array or arrays.

In the present application, the shape of the second micropores is not limited, and the shapes of the second micropores may be the same or different. In some embodiments, each of second micropores may have regular or irregular shape. In some embodiments, each of second micropores may have a circle, rectangle or square shape.

In some embodiments, the equivalent diameter of each of second micropores may be from 1 μm to 200 μm, for example, it may be about 5 μm, about 10 μm, about 20 μm, about 50 μm, about 80 μm, about 100 μm, about 120 μm, about 150 μm, about 180 μm, about 200 μm or within the range formed by any of the above values. In some embodiments, the equivalent diameter of each of second micropores may be from 5 μm to 180 μm, from 10 μm to 180 μm, from 20 μm to 180 μm, from 30 μm to 180 μm, from 50 μm to 180 μm, from 5 μm to 150 μm, from 10 μm to 150 μm, from 20 μm to 150 μm, from 30 μm to 150 μm or from 50 μm to 150 μm.

The equivalent diameter of each of second micropores may be a diameter of a circle having an area equal to that of each of second micropores. The equivalent diameter of the second micropores within the above ranges can enable the negative electrode plate to have good mechanical properties such as relatively high strength and good flexibility, under the premise of ensuring that the negative electrode plate has high infiltration rate of electrolyte. Therefore, the electrode assembly can have a high infiltration rate of electrolyte and good processing performance, and thus a secondary battery using the electrode assembly can also have good electrochemical performance and high productivity.

In some embodiments, the center-to-center distance between adjacent second micropores is from 1 mm to 10 mm, for example, may be about 1 mm, about 2 mm, about 3 mm, about 4 mm, about 5 mm, about 6 mm, about 7 mm, about 8 mm, about 9 mm, about 10 mm, or within the ranges formed by any of the above values.

Without being limited by any theory or explanation, the center-to-center distance between adjacent second micropores within the above ranges can result in proper distribution of the second micropores on the surface of the negative electrode plate. Thus, too dense distribution of the second micropores can be avoided, thus the negative electrode plate maintains good mechanical properties.

In the present application, the distribution form of the plurality of second micropores is not limited. In some embodiments, the plurality of second micropores may be distributed in an array or arrays.

In the present application, said positive electrode current collector has two surfaces opposite to each other in the direction of its own thickness, and said positive electrode film layer may be located on either or both of two opposite surfaces of said positive electrode current collector. Said negative electrode current collector has two surfaces opposite to each other in the direction of its own thickness, and said negative electrode film layer is provided on either or both of two opposite surfaces of said negative electrode current collector.

Figure 2:
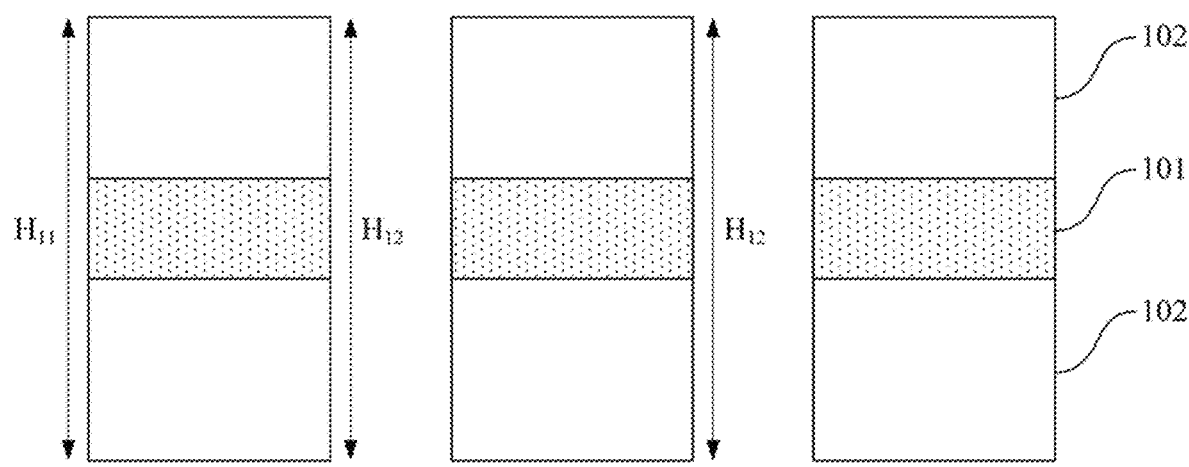
FIG. 2 is a schematic diagram of a water-based positive electrode plate according to another embodiment of the present application.

It should be noted, the thickness $H_{11}$ of the water-based positive electrode plate represents the sum of the thickness of the positive electrode current collector and the positive electrode film layer(s), and the thickness $H_{21}$ of the negative electrode plate represents the sum of the thickness of the negative electrode current collector and the negative electrode film layer(s). FIG. 1 is a partial cross-sectional schematic diagram of a water-based positive electrode plate according to an embodiment of the present application, and FIG. 2 is a partial cross-sectional schematic diagram of a water-based positive electrode plate according to another embodiment of the present application. As shown in FIG. 1 and FIG. 2, the positive electrode film layer 102 is arranged on both sides of the positive electrode current collector 101, wherein, FIG. 1 shows that the ratio of the depth of the first micropores to the thickness of the positive electrode plate is less than 100%, that is $H_{12}$ is less than $H_{11}$; FIG. 2 shows that he first micropore is a through hole penetrating through the positive electrode plate, and $H_{12}$ equals to $H_{11}$. In this application, the arrangement of the second micropores on the surface of the negative electrode plate is similar to that of the water-based positive electrode plate.

In the electrode assembly of the present application, the type of positive electrode active material is not specifically limited, and the positive electrode active material may be a positive electrode active material known in the art for use in secondary batteries. In some embodiments, the positive active material may comprise one or more of a lithium transition metal oxide, a lithium-containing phosphate of olivine structure, and respective modified compounds thereof. The modified compound of each positive electrode active material as mentioned above may be obtained by doping, surface coating, or both doping and surface coating simultaneously on the positive electrode active material.

Examples of lithium transition metal oxides may include one or more of lithium cobalt oxide, lithium nickel oxide, lithium manganese oxide, lithium nickel cobalt oxide, lithium manganese cobalt oxide, lithium nickel manganese oxide, lithium nickel cobalt manganese oxide, lithium nickel cobalt aluminum oxide, and the respective modified compounds thereof. Examples of lithium phosphates of olivine structure may include one or more of lithium iron phosphate, composite of lithium iron phosphate and with carbon, lithium manganese phosphate, lithium manganese phosphate composites with carbon, lithium manganese iron phosphate, lithium manganese iron phosphate composites with carbon, and the respective modified compounds thereof. These positive active materials may be used alone or in combination of two or more.

Optionally, the positive active material may comprise one or more of a lithium-containing phosphate of olivine structure, and the modified compounds thereof.

In some embodiments, the positive electrode film layer may further comprise one or more of a water-based binder and a conductive agent. The water-based binder may bond the positive electrode active material, conductive agent, etc. to the current collector, enhance the electronic contact between the positive electrode active material and the conductive agent and the electronic contact between the positive electrode active material and the positive electrode current collector, and stabilize the structure of the positive electrode plate. Compared with oil-based binders, such as polyvinylidene fluoride, water-based binders are cheaper, more environmentally friendly and safer to use.

The water-based binder may comprise an aqueous dispersion solution or an emulsion with a solid content of 5% or more. The water-based binder may also contain solids that can form a stable dispersion liquid with a solid content of 1% or more with water. In some embodiments, the water-based binder includes soluble polysaccharides and derivatives thereof, water-soluble or water-dispersed polymers or mixtures thereof. For example, the water-based binder may comprise methylcellulose and salts thereof, xanthan gum and salts thereof, chitosan and salts thereof, alginic acid and salts thereof, polyethyleneimine and salts thereof, polyacrylamide, acrylonitrile-acrylic acid copolymer and derivatives or mixtures thereof.

In some embodiments, the water-based binder may comprise a compound mixture of xanthan gum and polyethyleneimine. Optionally, mass ratio of the xanthan gum to the polyethyleneimine may be from 2:1 to 0.2:2.8, Optionally, the xanthan gum may have a number average molecular weight of from 300000 to 2000000. Optionally, the polyethyleneimine may have a number average molecular weight of from 2000 to 50000.

In some embodiments, the water-based binder may comprise a compound mixture of acrylonitrile-acrylic acid copolymer and polyethylencimine. Optionally, mass ratio of the acrylonitrile-acrylic acid copolymer to the polyethyleneimine may be from 2:1 to 0.2:2.8, Optionally, the acrylonitrile-acrylic acid copolymer may have a number average molecular weight of from 300000 to 2000000, Optionally, the polyethyleneimine may have a number average molecular weight of from 2000 to 70000.

Without being limited to any theory or explanation, the water-based binder selected from the above substances can further enhance the electronic contact between the positive electrode active material and the conductive agent and the electronic contact between the positive electrode active material and the positive electrode current collector, and stabilize the structure of the positive electrode plate. Therefore, the application of the electrode assembly of the present disclosure to a secondary battery can enable the secondary battery to have high cycle stability, and low internal resistance.

In the present application, the type of the conductive agent is not specifically limited. In some embodiments, the conductive agent may comprise one or more of conductive carbon black, superconducting carbon black, conductive graphite, acetylene black, Ketjen black, graphene, and carbon nanotubes.

In the electrode assembly of the present application, the positive electrode film layer is usually made by applying a positive electrode slurry to the positive electrode current collector followed by drying and cold pressing. Said positive electrode slurry is usually formed by dispersing the positive active material, a water-based binder, a conductive agent, and any other components in a deionized water and stirring uniformly.

In some embodiments, said positive electrode current collector may be a metal foil or a composite current collector. As an example of a metal foil, an aluminum foil may be used. The composite current collector may comprise a polymeric material matrix layer and a metallic material layer formed on at least one surface of the polymeric material matrix layer. Examples of the metallic material may comprise one or more of aluminum, aluminum alloy, nickel, nickel alloy, titanium, titanium alloy, silver, and silver alloy. Examples of the polymeric material matrix layer may comprises one or more of polypropylene (PP), polyethylene terephthalate (PET), polybutylene terephthalate (PBT), polystyrene (PS), polyethylene (PE), etc.

In the electrode assembly of the present application, the negative electrode film layer is usually made by applying a negative electrode slurry to the negative electrode current collector followed by drying and cold pressing. Said negative electrode slurry is usually formed by dispersing the negative active material, an optional conductive agent, an optional binder, and any other optional additives in a solvent and stirring uniformly. The solvent may be N-methylpyrrolidone (NMP), but is not limited thereto. Examples of the binder used for the negative electrode film layer may comprise one or more of styrene-butadiene rubber (SBR), water-soluble unsaturated resin SR-1B, water-based acrylic resin (such as polyacrylic acid PAA, polymethacrylic acid PMAA, sodium polyacrylate PAAS), polyacrylamide (PAM), polyvinyl alcohol (PVA), sodium alginate (SA), and carboxymethyl chitosan (CMCS). For example, the conductive agent used for the negative electrode film layer may comprise one or more of superconducting carbon, acetylene black, carbon black, Ketjen black, carbon dots, carbon nanotubes, graphene, and carbon nanofibers. Other optional additives may include one or more of a thickener (for example sodium carboxymethyl cellulose, CMC) and a PTC thermistor material.

The type of negative electrode active material is not specifically limited, and the negative electrode active material may be a negative electrode active material known in the art for use in secondary batteries. As an example, the negative electrode active material may comprise one or more of graphite, soft carbon, hard carbon, mesocarbon microspheres, carbon fibers, carbon nanotubes, silicon-based materials, tin-based materials, and lithium titanate. The silicon-based materials may include one or more of elemental silicon, silicon oxide, silicon-carbon composite, silicon-nitrogen composite, and silicon alloy. The tin-based materials may include one or more of elemental tin, tin oxide, and tin alloy materials. The present application is not limited to these materials, but may use other conventionally known materials that can be used as negative active materials for secondary batteries. These negative electrode active materials may be used alone or in combination of two or more.

The type of negative electrode current collector is not specifically restricted in the present application, and can be selected by those skilled in the art according to actual requirements. For example the negative electrode collector may be a metal foil or a composite collector. As an example of a metal foil, a copper foil may be used as a negative electrode current collector. The composite current collector may comprise a polymeric material matrix layer and a metallic material layer formed on at least one surface of the polymeric material matrix layer. As an example, the metal material can be selected from one or more of aluminum, aluminum alloy, nickel, nickel alloy, titanium, titanium alloy, silver, and silver alloy. As an example, the polymeric material matrix layer may selected from one or more of polypropylene (PP), polyethylene terephthalate (PET), polybutylene terephthalate (PBT), polystyrene (PS), and polyethylene (PE).

In addition, in the electrode assembly of the present application, the negative electrode plate does not exclude other additional functional layers than said negative electrode film layer. For example, in some embodiments, the negative electrode plate described in the present application may further comprise a conductive primer (e.g. being composed of a conductive agent and a binder) disposed between the negative electrode current collector and the negative electrode film layer. In some other embodiments, the negative electrode plate described in this application further comprises a protective layer covering the surface of the negative electrode film layer.

In the electrode assembly of the present application, the manner of implementing the first micropores and the second micropores is not specifically limited, and the first micropores and the second micropores can be implemented by means known in the art. In some embodiments, the method of providing the first micropores and the second micropores on the surface of the plate may comprise any one of laser drilling, mechanical punching or a combination thereof. For example, when laser drilling is used, the lasers can be arranged in a staggered manner from top and bottom, a suitable drilling array may be configured according to the requirements of the drilling process plan, and the appropriate laser energy can be selected according to the required depth of micropores.

In some embodiments, the electrode assembly further comprises a separator. The separator is arranged between the water-based positive electrode plate and the negative electrode plate, and mainly function as preventing short circuit of the positive and negative electrodes while allowing active ions to pass through. The type of the separator is not particularly limited in the present application, and any well-known porous structure separator having electrochemical stability and mechanical stability can be selected.

As an example, materials of the separator may include at least one of glass fiber, non-woven fabric, polyethylene, polypropylene, and polyvinylidene fluoride. The separator can be a single-layer film or a multilayer film. When the separator is a multilayer film, the materials of each layer may be the same or different.

In some embodiments, said water-based positive electrode plate, said separator, and said negative electrode plate may be made into an electrode assembly by a winding process or a laminating process.

In this application, the thickness of the film layer and the electrode plate has well-known meaning in the art, and can be measured by methods known in the art. For example, the measurement is performed using a screw micrometer.

In this application, the volume average particle size Dv50 of a material has a well-known meaning in the art, means the particle diameter corresponding to the particle size when the cumulative volume distribution percentage of the material reaches 50%, and can be measured by instruments and methods well-known in the art. For example, it can be readily measured according to "Particle Size Analysis—Laser Diffraction Method" of GB/T 19077-2016 using a laser particle size analyzer. As an example, the Mastersizer 2000E particle size analyzer from Malvern Instruments Co., Ltd., UK is used.

In this application, the compaction density of the negative electrode plate has well-known meaning in the art, and may be measured by methods known in the art. The compaction density of a plate=the areal density of the film layer/the thickness of the film layer. The areal density of the film layer is a well-known meaning in the art, and can be tested by methods known in the art, such as taking a plate having one side coated and cold-pressed (if a plate has both sides coated, one of the film layers on two sides can be wiped off first), punching and cutting into small discs, and weighing them; then wiping off the film layer of the above-mentioned weighed electrode plate, and weighing the weight of the current collector. The areal density of the film layer=(the weight of a small disc−the weight of a current collector)/the area of the small disc.

Secondary Battery

A second aspect of the present application provides a secondary battery, comprising the electrode assembly of the first aspect of the present application and an electrolyte. The electrolyte functions as conducting active ions between the positive electrode plate and the negative electrode plate. There is no specific limitation on the type of electrolyte in the present application, and it can be selected according to the requirement. For example, the electrolyte may be selected from at least one of solid electrolyte and liquid electrolyte (i.e., electrolytic solution).

In some embodiments, an electrolytic solution is used as the electrolyte. The electrolytic solution comprises an electrolyte salt and a solvent.

The type of electrolyte salt is not specifically restricted in the present application, and can be selected by those skilled in the art according to actual requirements. In some embodiments, as an example, the electrolyte salt may comprise one or more selected from lithium hexafluorophosphate ($LiPF_6$), lithium tetrafluoroborate ($LiBF_4$), lithium perchlorate ($LiClO_4$), lithium hexafluoroarsenate $LiAsF_6$), lithium difluorosulfimide (LiFSI), lithium bistrifluoromethanesulfonimide (LiTFSI), lithium trifluoromethanesulfonate (LiTFS), lithium difluorooxalate (LiDFOB), lithium bisoxalate (LiBOB), lithium difluorophosphate ($LiPO_2F_2$), lithium difluorobisoxalate phosphate (LiDFOP), and lithium tetrafluorooxalate phosphate (LiTFOP).

The type of solvent is not specifically restricted in the present application, and can be selected by those skilled in the art according to actual requirements. In some embodiments, the solvent may comprise one or more selected from ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), methyl ethyl sulfone (EMS) and diethyl sulfone (ESE).

In some embodiments, the electrolytic solution may optionally comprise an additive. For example, the additives may comprise negative electrode film-forming additives, positive electrode film-forming additives, and additives that can improve certain performance of the battery, such as additives that improve overcharge performance of the battery, additives that improve high-temperature performance of the battery, and those that improve low-temperature rating performance of the battery.

In some embodiments, the secondary battery may include an outer package. The outer package may be used to encapsulate said electrode assembly and electrolyte.

In some embodiments, the outer package of secondary battery may be a hard case, such as a hard plastic case, an aluminum case, a steel case, and the like. The outer package of the secondary battery may also be a soft pack, such as a pouch type soft pack. The material of the soft package may be plastic, such as one or more of polypropylene (PP), polybutylene terephthalate (PBT), polybutylene succinate (PBS), and the like.

Figure 3:
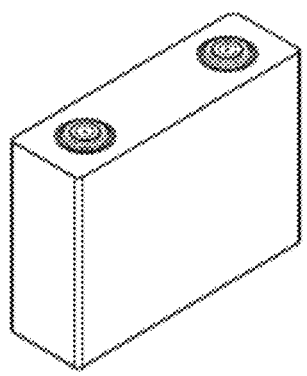
FIG. 3 is a schematic diagram of a secondary battery according to an embodiment of the present application.

In the present application, there is no specific limitation on the shape of the secondary battery, which can flat body, rectangular or other arbitrary shapes. FIG. 3 shows a secondary battery 5 with a rectangular structure as an example.

Figure 4:
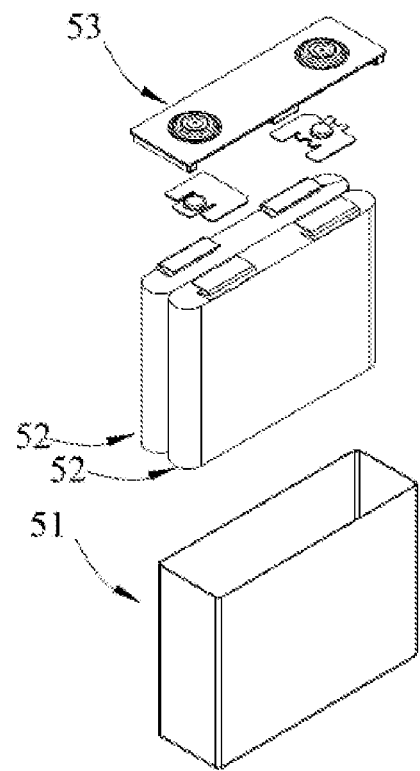
FIG. 4 is an exploded view of a secondary battery according to the embodiment of the present application as shown in FIG. 3.

In some embodiments, referring to FIG. 4, the outer package may include a housing 51 and a cover plate 53. The housing 51 may include a bottom plate and side plates connected to the bottom plate, and the bottom plate and the side plates are combined to form an accommodating cavity. The housing 51 has an opening communicating with the accommodating cavity, and the cover plate 53 is used to cover the opening to close the accommodating cavity. The electrode assemblies 52 according to the first aspect of the embodiments of the present application are encapsulated in the accommodating cavity. The electrode assemblies 52 are infiltrated into the electrolytic solution. The number of electrode assemblies 52 contained in the secondary battery 5 may be one or more, which may be adjusted according to the demand.

The preparation method of the secondary battery of the present application is well known. In some embodiments, the electrode assembly can be placed in an outer package, dried and then injected with an electrolytic solution, and then subjected to vacuum encapsulation, standing, chemical formation, and shaping, thereby obtaining a secondary battery.

Battery module and a battery pack

The secondary battery of the present application can be assembled into a battery module, and the number of secondary batteries contained in the battery module can be multiple, and the specific number can be adjusted according to the application and capacity of the battery module.

Figure 5:
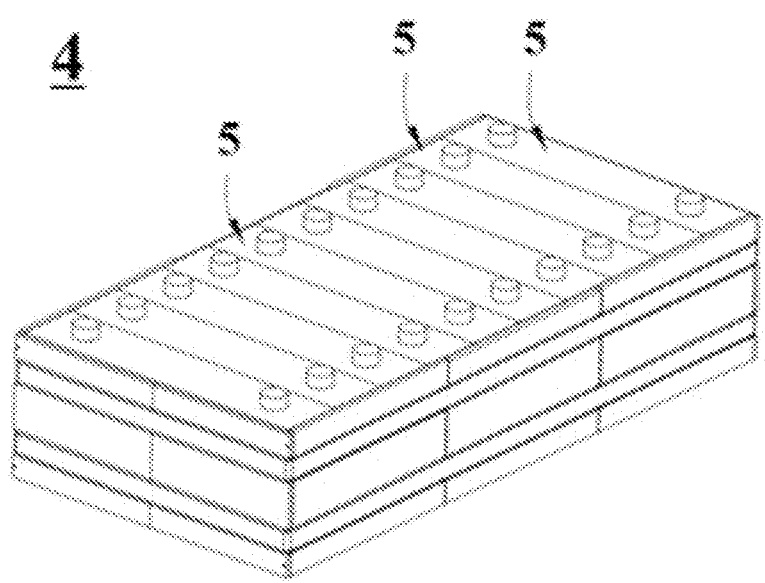
FIG. 5 is a schematic diagram of a battery module according to an embodiment of the present application.

FIG. 5 is a schematic diagram of a battery module 4 as an example. Referring to FIG. 5, in the battery module 4, a plurality of secondary batteries 5 may be disposed sequentially in the length direction of the battery module 4. Apparently, they may also be disposed in any other manner. Furthermore, the plurality of secondary batteries 5 may be fixed by fasteners.

Optionally, the battery module 4 may further include a housing having an accommodating space in which a plurality of secondary batteries 5 are accommodated.

In some embodiments, the above-mentioned battery modules can also be assembled into a battery pack, and the number of battery modules included in the battery pack can be adjusted according to the application and capacity of the battery pack.

Figure 6:
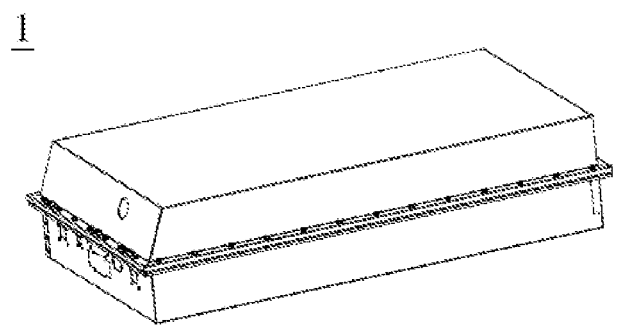
FIG. 6 is a schematic diagram of a battery pack according to an embodiment of the present application.
Figure 7:
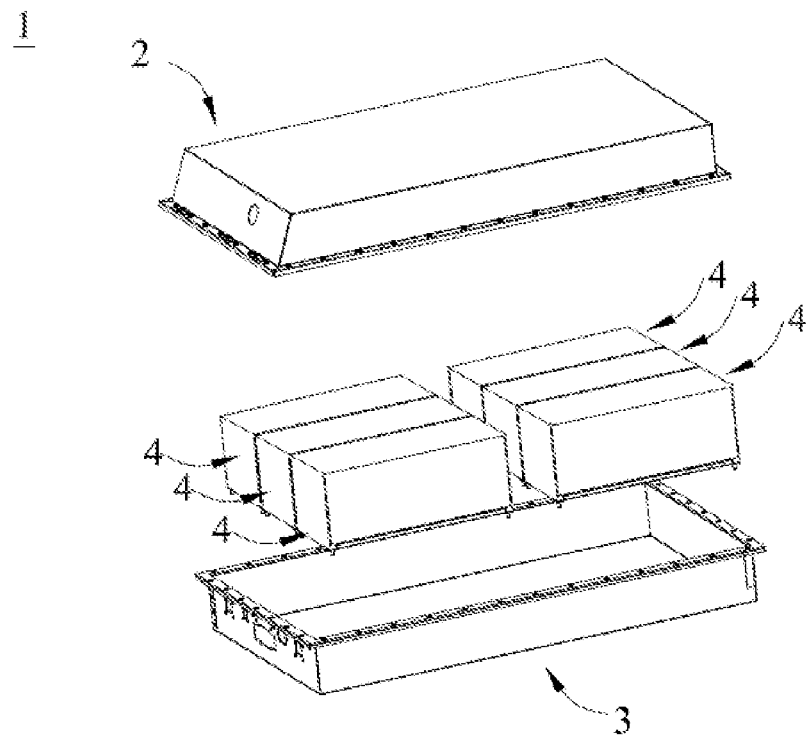
FIG. 7 is an exploded view of the battery pack according to the embodiment of the present application as shown in FIG. 6.

FIGS. 6 and 7 are schematic diagrams of battery pack 1 as an example. As shown in FIGS. 6 and 7, the battery pack 1 may comprise a battery case and a plurality of the battery modules 4 disposed in the battery case. The battery case comprises an upper case body 2 and a lower case body 3. The upper case body 2 is used for covering the lower case body 3 to form a closed space for receiving the battery modules 4. A plurality of battery modules 4 can be disposed in the battery case in any manner.

Electrical Device

Embodiments of the present application further provide an electrical device comprising at least one of the secondary battery, battery module, and battery pack of the present application. The secondary battery, battery module or battery pack can be used as a power source of the electrical device, and can also be used as an energy storage unit of the electrical device. The electrical device may be, but is not limited to, a mobile device (e.g., a mobile phone, a laptop computer, etc.), an electric vehicle (e.g., a pure electric vehicle, a hybrid electric vehicle, a plug-in hybrid electric vehicle, an electric bicycle, an electric scooter, an electric golf vehicle, an electric truck), an electric train, a ship, a satellite, an energy storage system, etc.

The electrical device may comprise the secondary battery, the battery module or the battery pack selected according to its usage requirements.

Figure 8:
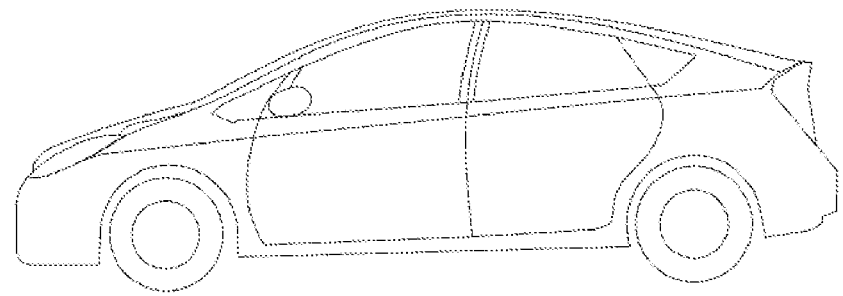
FIG. 8 is a schematic diagram of an electrical device according to an embodiment of the present application using the secondary battery of the present application as power.

FIG. 8 is a schematic diagrams of an electrical device as an example. The electrical device is a pure electric vehicle, a hybrid electric vehicle, or a plug-in hybrid electric vehicle. In order to meet high power and high energy density requirements of the electrical device, a battery pack or a battery module can be used.

As another example, the electrical device may be a mobile phone, a tablet computer, a notebook computer, etc. The electric device is generally required to be light and thin, and a secondary battery can be used as a power source.

EXAMPLES

The following examples are intended to describe the present application more specifically, merely for the purpose of illustration. Various modifications and variations within the scope of the present application are apparent to those skilled in the related art. Unless otherwise stated, all parts, percentages, and ratios reported in the following examples are based on mass, and all reagents used in the examples are commercially available or synthesized by conventional methods, and can be directly obtained without further treatment, and the instruments used in the examples are commercially available.

The secondary batteries of Examples 1-25 and Comparative Examples 4-10 were prepared according to the following method.

(1) Preparation of Water-Based Positive Electrode Plate

Lithium iron phosphate as a positive electrode active material, a conductive carbon black as a conductive agent, and a water-based binder were mixed at a mass ratio of 96:1:3, and an appropriate amount of deionized water was added to obtain a positive electrode slurry with a solid content of 50%; the positive electrode slurry was evenly applied on a surface of the positive electrode current collector, and after drying, a double-sided coated water-based positive electrode plate was obtained. The water-based binder was a compound of polyacrylonitrile-acrylate copolymer LA-133 (purchased from Sichuan Yindile Technology Co., Ltd.) and polyethyleneimine. In this compound, LA-133 and polyethyleneimine were in a mass ratio of 1:1.

A laser drilling device was used to perforate the water-based positive electrode plate, so that a plurality of first micropores were arranged on the surface of the water-based positive electrode plate. The equivalent diameter $d_1$ (μm) of the first micropores, the center-to-center distance $L_1$ (mm) of adjacent first micropores, the ratio $S_{12}/S_{11}$ of the total area of the plurality of first micropores to the area of the water-based positive electrode plate, the ratio $H_{12}/H_{11}$ of the depth of the first micropores to the thickness of the water-based positive electrode plate, the compaction density of $C_1$ (g/cc) of the aqueous positive electrode plate, the volume average particle size $D_1$ (μm) of the positive electrode active material, and $(S_{12} \times H_{12} \times D_1)/(S_{11} \times C_1 \times H_{11})$ are shown in Table 1, respectively.

(2) Preparation of Negative Electrode Plate

Artificial graphite as negative electrode active material, a conductive carbon black as a conductive agent, styrene butadiene rubber (SBR) as a binder, and carboxymethyl cellulose sodium (CMC) as a thickener were mixed in a mass ratio of 96.2:1.8:0.8:1.2, an appropriate amount of deionized water was added, and mixed evenly to obtain a negative electrode slurry; the negative electrode slurry was evenly applied on surface of the negative electrode current collector and dried, thereby obtaining a double-sided coated negative electrode plate.

A laser drilling device was used to perforate the negative electrode plate, so that a plurality of second micropores were arranged on the surface of the negative electrode plate. The equivalent diameter $d_2$ (μm) of the second micropores, the center-to-center distance $L_2$ (mm) of adjacent second micropores, the ratio $S_{22}/S_{21}$ of the total area of the plurality of second micropores to the area of the negative electrode plate, the ratio $H_{22}/H_{21}$ of the depth of the second micropores to the thickness of the negative electrode plate, the compaction density of $C_2$ (g/cc) of the negative electrode plate, the volume average particle size $D_2$ (μm) of the negative electrode active material, and $(S_{22} \times H_{22} \times D_2)/(S_{21} \times C_2 \times H_{21})$ are shown in Table 1, respectively.

(3) Preparation of Electrolytic Solution

In an argon atmosphere glove box ($H_2O<0.1$ ppm, $O_2<0.1$ ppm), the organic solvent ethylene carbonate (EC) and ethyl methyl carbonate (EMC) according to the volume ratio of 3:7 was mixed evenly, 12.5% $LiPF_6$ was added and dissolved in the organic solvent, and after stirring evenly, an electrolytic solution was obtained.

(4) Separator

A polypropylene film was used as the separator.

(5) Preparation of Secondary Battery

The water-based positive electrode plate, the separator, and the negative electrode plate was stacked in order, so that the separator was sandwiched between the water-based positive electrode plate and the negative electrode plate and provided the function of isolation; the stacked water-based positive electrode plate, the separator, the negative electrode plate was wound to obtain an electrode assembly; after welding tabs to the electrode assembly, the electrode assembly was put into an aluminum shell, and dried to remove moisture; the electrolytic solution was injected into the aluminum shell which was then sealed to obtain an uncharged battery; The uncharged battery was sequentially subjected to standing, hot and cold pressing, chemical formation, shaping, capacity testing and other processes to obtain a secondary battery.

Comparative Example 1

The preparation of the water-based positive electrode plate, the preparation of the negative electrode plate, the preparation of the separator, the electrolyte, and the preparation process of the secondary battery were basically the same as in Example 1, expect that no perforation was performed on the surfaces of the water-based positive electrode plate and negative electrode plate.

Comparative Example 2-3

The preparation of the water-based positive electrode plate, the preparation of the negative electrode plate, the preparation of the separator, the electrolyte, and the preparation process of the secondary battery were basically the same as in Example 1, expect that no perforation was performed on the surface of the negative electrode plate in Comparative Example 2, and no perforation was performed on the surface of the water-based positive electrode plate in Comparative Example 3.

TEST SECTION (1) Electrolyte Wetting Performance Test of Electrode Assembly

After the uncharged batteries obtained in the Examples and Comparative Examples were subjected to standing for different periods of time, the first charge test was performed. Current for the first charge was set to 0.1C (51.2 A), and the charge cut-off voltage was set to 3.65V. After charging, the battery was disassembled in a dry room and observed to determine whether a large surface area of the negative electrode plate was gray-white due to lithium deposition. If a black area was found on the surface, it indicated that the infiltration of the electrolytic solution was not sufficient. If a black area was not exposed on the surface, it indicated that the electrolytic solution completely infiltrated the negative electrode plate, and the minimum time required for the electrolytic solution to completely infiltrate the negative electrode plate was recorded. During the test, a group was set up for each additional half-hour infiltrating time, and three electrode assemblies were disassembled for each group, and the shortest time $T_1$ required for all of the three electrode assemblies to achieve the complete infiltration of the negative electrode plate in the electrolytic solution was recorded as electrolyte infiltrating time of the electrode assemblies.

(2) Test for Drying Performance of Secondary Battery

The non-electrolyte-injected batteries obtained in Examples and Comparative Examples were placed in a vacuum oven for testing the drying performance. The temperature of the oven was set at 105° C., and water content of the battery was measured every 1 hour. When the water content of the battery was lower than 200 ppm (mass concentration), the battery was considered to have been dried, and the drying time $T_2$ was recorded.

(3) Test for Initial Capacity and Cycle Performance of Secondary Battery

A battery tester was used to perform a charge and discharge test on a secondary battery. In the test, the charge and discharge voltage was set to a voltage of from 2.5V to 3.65V, the charge and discharge current was set to 1C (512 A), and the discharge capacity after the first cycle of the secondary battery and the discharge capacity after 300 cycles were recorded.

The average value of the discharge capacities of the three secondary batteries after the first cycle was taken as the initial capacity of the secondary battery.

Capacity retention rate after 300 cycles of secondary battery=(discharge capacity after 300 cycles/discharge capacity after the first cycle)×100%.

(4) Test for Direct Current Impedance (DCR) of Secondary Battery

At 25° C., the secondary battery was charged with a constant current of ⅓C to 3.65V, and then charged with a constant voltage of 3.65V to a current of 0.05C. After standing for 5 minutes, the voltage $V_1$ at this time was recorded; the secondary battery was discharged at a constant current of ⅓C for 30 s, the voltage $V_2$ at this time was recorded. The internal resistance after the first cycle was represented by $(V_2-V_1)/(⅓C)$. The above steps were repeated, and the internal resistance of the secondary battery after 300 cycles was recorded.

The parameters of Examples and Comparative Examples are shown in Table 1 and the test results are shown in Table 2.

TABLE 1

| | Water-based positive electrode plate | | | | | | |
|---|---|---|---|---|---|---|---|
| No. | $d_1$ (μm) | $L_1$ (mm) | $S_{12}/S_{11}$ | $H_{12}/H_{11}$ | $C_1$ (g/cc) | $D_1$ (μm) | $(S_{12} \times H_{12} \times D_1)/(S_{11} \times C_1 \times H_{11})$ |
| Example 1 | 50 | 2 | 0.049063% | 1 | 2.5 | 1.0 | 0.019625% |
| Example 2 | 100 | 2 | 0.196250% | 1 | 2.5 | 1.0 | 0.078500% |
| Example 3 | 150 | 2 | 0.441563% | 1 | 2.5 | 1.0 | 0.176625% |
| Example 4 | 200 | 2 | 0.785000% | 1 | 2.5 | 1.0 | 0.314000% |
| Example 5 | 150 | 1 | 1.766250% | 1 | 2.5 | 1.0 | 0.706500% |
| Example 6 | 150 | 4 | 0.110391% | 1 | 2.5 | 1.0 | 0.044156% |
| Example 7 | 150 | 10 | 0.017663% | 1 | 2.5 | 1.0 | 0.007065% |
| Example 8 | 150 | 2 | 0.441563% | 0.3 | 2.5 | 1.0 | 0.052988% |
| Example 9 | 150 | 2 | 0.441563% | 0.6 | 2.5 | 1.0 | 0.105975% |
| Example 10 | 150 | 2 | 0.441563% | 1 | 2.3 | 1.0 | 0.191984% |
| Example 11 | 150 | 2 | 0.441563% | 0.6 | 2.5 | 1.0 | 0.105975% |
| Example 10 | 150 | 2 | 0.441563% | 1 | 2.3 | 1.0 | 0.191984% |
| Example 11 | 150 | 2 | 0.441563% | 1 | 2.7 | 1.0 | 0.163542% |
| Example 12 | 150 | 2 | 0.441563% | 1 | 2.5 | 0.7 | 0.123638% |
| Example 13 | 150 | 2 | 0.441563% | 1 | 2.5 | 1.3 | 0.229613% |
| Example 14 | 150 | 2 | 0.441563% | 1 | 2.5 | 1.0 | 0.176625% |
| Example 15 | 150 | 2 | 0.441563% | 1 | 2.5 | 1.0 | 0.176625% |
| Example 16 | 150 | 2 | 0.441563% | 1 | 2.5 | 1.0 | 0.176625% |
| Example 17 | 150 | 2 | 0.441563% | 1 | 2.5 | 1.0 | 0.176625% |
| Example 18 | 150 | 2 | 0.441563% | 1 | 2.5 | 1.0 | 0.176625% |
| Example 19 | 150 | 2 | 0.441563% | 1 | 2.5 | 1.0 | 0.176625% |
| Example 20 | 150 | 2 | 0.441563% | 1 | 2.5 | 1.0 | 0.176625% |
| Example 21 | 150 | 2 | 0.441563% | 1 | 2.5 | 1.0 | 0.176625% |
| Example 22 | 150 | 2 | 0.441563% | 1 | 2.5 | 1.0 | 0.176625% |
| Example 23 | 150 | 2 | 0.441563% | 1 | 2.5 | 1.0 | 0.176625% |
| Example 24 | 150 | 2 | 0.441563% | 1 | 2.5 | 1.0 | 0.176625% |
| Example 25 | 150 | 2 | 0.441563% | 1 | 2.5 | 1.0 | 0.176625% |
| Comparative Example 1 | \ | \ | \ | \ | \ | \ | \ |
| Comparative Example 2 | 150 | 2 | 0.441563% | 1 | 2.5 | 1.0 | 0.176625% |
| Comparative Example 3 | \ | \ | \ | \ | \ | \ | \ |
| Comparative Example 4 | 0.3 | 2 | 0.000002% | 1 | 2.5 | 1.0 | 0.000001% |

TABLE 1-continued

| | | | | | | | | |
|---|---|---|---|---|---|---|---|---|
| Comparative Example 5 | 1 | 2 | 0.000020% | 1 | 2.5 | 1.0 | 0.000008% | |
| Comparative Example 6 | 500 | 2 | 4.906250% | 1 | 2.5 | 1.0 | 1.962500% | |
| Comparative Example 7 | 150 | 0.5 | 7.065000% | 1 | 2.5 | 1.0 | 2.826000% | |
| Comparative Example 8 | 150 | 2 | 0.441563% | 1 | 2.5 | 1.0 | 0.176625% | |
| Comparative Example 9 | 150 | 2 | 0.441563% | 1 | 2.5 | 1.0 | 0.176625% | |
| Comparative Example 10 | 150 | 2 | 0.441563% | 1 | 2.5 | 1.0 | 0.176625% | |

| | Negative electrode plate | | | | | | | | |
|---|---|---|---|---|---|---|---|---|---|
| o. | $d_2$ (μm) | $L_2$ (mm) | $S_{22}/S_{21}$ | $H_{22}/H_{21}$ | $C_2$ (g/cc) | $D_2$ (μm) | $(S_{22} \times H_{22} \times D_2)/(S_{21} \times C_2 \times H_{21})$ | A/B | $S_3/S_{22}$ |
| Example 1 | 100 | 4 | 0.049063% | 1 | 1.6 | 17.0 | 0.521289% | 0.038 | 46% |
| Example 2 | 100 | 4 | 0.049063% | 1 | 1.6 | 17.0 | 0.521289% | 0.15 | 50% |
| Example 3 | 100 | 4 | 0.049063% | 1 | 1.6 | 17.0 | 0.521289% | 0.34 | 68% |
| Example 4 | 100 | 4 | 0.049063% | 1 | 1.6 | 17.0 | 0.521289% | 0.60 | 67% |
| Example 5 | 100 | 4 | 0.049063% | 1 | 1.6 | 17.0 | 0.521289% | 1.4 | 72% |
| Example 6 | 100 | 4 | 0.049063% | 1 | 1.6 | 17.0 | 0.521289% | 0.08 | 34% |
| Example 7 | 100 | 4 | 0.049063% | 1 | 1.6 | 17.0 | 0.521289% | 0.01 | 23% |
| Example 8 | 100 | 4 | 0.049063% | 1 | 1.6 | 17.0 | 0.521289% | 0.10 | 68% |
| Example 9 | 100 | 4 | 0.049063% | 1 | 1.6 | 17.0 | 0.521289% | 0.20 | 68% |
| Example 10 | 100 | 4 | 0.049063% | 1 | 1.6 | 17.0 | 0.521289% | 0.37 | 68% |
| Example 11 | 100 | 4 | 0.049063% | 1 | 1.6 | 17.0 | 0.521289% | 0.20 | 68% |
| Example 10 | 100 | 4 | 0.049063% | 1 | 1.6 | 17.0 | 0.521289% | 0.37 | 68% |
| Example 11 | 100 | 4 | 0.049063% | 1 | 1.6 | 17.0 | 0.521289% | 0.31 | 68% |
| Example 12 | 100 | 4 | 0.049063% | 1 | 1.6 | 17.0 | 0.521289% | 0.24 | 68% |
| Example 13 | 100 | 4 | 0.049063% | 1 | 1.6 | 17.0 | 0.521289% | 0.44 | 68% |
| Example 14 | 1 | 4 | 0.000005% | 1 | 1.6 | 17.0 | 0.000052% | 3388 | 83% |
| Example 15 | 10 | 4 | 0.000491% | 1 | 1.6 | 17.0 | 0.005213% | 34 | 75% |
| Example 16 | 50 | 4 | 0.012266% | 1 | 1.6 | 17.0 | 0.130322% | 1.36 | 67% |
| Example 17 | 200 | 4 | 0.196250% | 1 | 1.6 | 17.0 | 2.085156% | 0.08 | 46% |
| Example 18 | 100 | 6 | 0.021806% | 1 | 1.6 | 17.0 | 0.231684% | 0.76 | 54% |
| Example 19 | 100 | 8 | 0.012266% | 1 | 1.6 | 17.0 | 0.130322% | 1.4 | 77% |
| Example 20 | 100 | 4 | 0.049063% | 0.3 | 1.6 | 17.0 | 0.156387% | 1.1 | 68% |
| Example 21 | 100 | 4 | 0.049063% | 0.6 | 1.6 | 17.0 | 0.312773% | 0.56 | 68% |
| Example 22 | 100 | 4 | 0.049063% | 1 | 1.4 | 17.0 | 0.595759% | 0.30 | 68% |
| Example 23 | 100 | 4 | 0.049063% | 1 | 1.8 | 17.0 | 0.463368% | 0.38 | 68% |
| Example 24 | 100 | 4 | 0.049063% | 1 | 1.6 | 15.0 | 0.459961% | 0.38 | 68% |
| Example 25 | 100 | 4 | 0.049063% | 1 | 1.6 | 19.0 | 0.582617% | 0.30 | 68% |
| Comparative Example 1 | \ | \ | \ | \ | \ | \ | \ | \ | \ |
| Comparative Example 2 | \ | \ | \ | \ | \ | \ | \ | \ | \ |
| Comparative Example 3 | 100 | 4 | 0.049063% | 1 | 1.6 | 17.0 | 0.521289% | \ | \ |

TABLE 1-continued

| | | | | | | | | | |
|---|---|---|---|---|---|---|---|---|---|
| Comparative Example 4 | 100 | 4 | 0.049063% | 1 | 1.6 | 17.0 | 0.521289% | 0.000001 | 1% |
| Comparative Example 5 | 100 | 4 | 0.049063% | 1 | 1.6 | 17.0 | 0.521289% | 0.000015 | 4% |
| Comparative Example 6 | 100 | 4 | 0.049063% | 1 | 1.6 | 17.0 | 0.521289% | 3.8 | 87% |
| Comparative Example 7 | 100 | 4 | 0.049063% | 1 | 1.6 | 17.0 | 0.521289% | 5.4 | 92% |
| Comparative Example 8 | 100 | 1 | 0.785% | 1 | 1.6 | 17.0 | 8.340625% | 0.02 | 36% |
| Comparative Example 9 | 400 | 4 | 0.785% | 1 | 1.6 | 17.0 | 8.340625% | 0.02 | 29% |
| Comparative Example 10 | 100 | 0.5 | 3.14% | 1 | 1.6 | 17.0 | 33.3625% | 0.005 | 19% |

Note:
A represents $(S_{12} \times H_{12} \times D_1)/(S_{11} \times C_1 \times H_{11})$, B represents $(S_{22} \times H_{22} \times D_2)/(S_{21} \times C_2 \times H_{21})$.

TABLE 2

| No. | Electrolyte complete infiltrating time $T_1$ (h) | Drying time $T_2$ (h) | Initial capacity (Ah) of battery | Capacity retention rate of battery after 300 cycles | Internal resistance of battery after 300 cycles ($\Omega$) |
|---|---|---|---|---|---|
| Example 1 | 43 | 45 | 177.4 | 77.30% | 1.61 |
| Example 2 | 22 | 18 | 177.3 | 79.30% | 1.54 |
| Example 3 | 15 | 14 | 177.3 | 86.60% | 1.48 |
| Example 4 | 11 | 13 | 176.6 | 86.70% | 1.46 |
| Example 5 | 10 | 13 | 176.1 | 86.80% | 1.46 |
| Example 6 | 34 | 28 | 177.4 | 78.60% | 1.56 |
| Example 7 | 54 | 57 | 177.5 | 76.50% | 1.62 |
| Example 8 | 25 | 22 | 177.3 | 79.10% | 1.57 |
| Example 9 | 20 | 16 | 177.3 | 79.50% | 1.54 |
| Example 10 | 16 | 15 | 177.3 | 86.40% | 1.50 |
| Example 11 | 15 | 15 | 177.3 | 85.40% | 1.52 |
| Example 12 | 19 | 16 | 177.3 | 81.70% | 1.53 |
| Example 13 | 13 | 13 | 177.1 | 87.00% | 1.45 |
| Example 14 | 76 | 71 | 177.7 | 74.30% | 1.81 |
| Example 15 | 56 | 60 | 177.0 | 75.50% | 1.69 |
| Example 16 | 33 | 42 | 177.4 | 77.70% | 1.59 |
| Example 17 | 10 | 13 | 176.1 | 86.80% | 1.46 |
| Example 18 | 22 | 18 | 177.3 | 79.30% | 1.54 |
| Example 19 | 33 | 38 | 177.4 | 77.70% | 1.59 |
| Example 20 | 30 | 42 | 177.3 | 75.90% | 1.66 |
| Example 21 | 17 | 15 | 177.0 | 77.70% | 1.59 |
| Example 22 | 20 | 16 | 177.3 | 85.40% | 1.52 |
| Example 23 | 12 | 13 | 177.3 | 87.00% | 1.45 |
| Example 24 | 19 | 16 | 177.3 | 86.30% | 1.49 |
| Example 25 | 14 | 13 | 177.3 | 86.80% | 1.46 |
| Comparative Example 1 | >120 (not completely infiltrated) | >120 | 134.6 | 71.90% | 5.39 |
| Comparative Example 2 | >120 (not completely infiltrated) | >120 | 142.9 | 74.30% | 3.68 |
| Comparative Example 3 | >120 (not completely infiltrated) | >120 | 139.8 | 72.00% | 3.74 |
| Comparative Example 4 | 107 | 109 | 177.7 | 71.90% | 1.96 |
| Comparative Example 5 | 95 | 97 | 177.7 | 72.00% | 1.87 |
| Comparative Example 6 | 9 | 12 | 175.2 | 87.00% | 1.45 |
| Comparative Example 7 | 8 | 10 | 174.3 | 87.20% | 1.44 |
| Comparative Example 8 | 8 | 10 | 174.3 | 87.20% | 1.44 |

TABLE 2-continued

| No. | Electrolyte complete infiltrating time $T_1$ (h) | Drying time $T_2$ (h) | Initial capacity (Ah) of battery | Capacity retention rate of battery after 300 cycles | Internal resistance of battery after 300 cycles (Ω) |
|---|---|---|---|---|---|
| Comparative Example 9 | 8 | 10 | 174.3 | 87.20% | 1.44 |
| Comparative Example 10 | 5 | 9 | 174.0 | 87.70% | 1.42 |

According to Table 1 and Table 2, it can be seen that in the electrode assemblies of Examples 1-25, the water-based positive electrode plate and the negative electrode plate satisfy the conditions defined in this application, which allows the secondary batteries to have a high initial capacity, a high electrolyte infiltration rate and a high drying rate, meanwhile the secondary batteries also have high cycle capacity retention rate and low internal resistance.

In Comparative Examples 1-3, no micropore is provided on surface of the water-based positive electrode plate and/or negative electrode plate, and the electrolyte infiltration rate and drying rate of the electrode assemblies are too small, and more moisture is likely to remain in the electrode assemblies. Therefore, the secondary batteries in which the electrode assemblies are applied have high internal resistance and poor cycle performance. In Comparative Example 4-5, micropores are present on the surface of the water-based positive electrode plate and the negative electrode plate, but in the prepared water-based positive electrode plate, $(S_{12} \times H_{12} \times D_1)/(S_{11} \times C_1 \times H_{11})$ is less than 0.001%. As a result, the electrode assemblies have slightly increased electrolyte infiltration rate and drying rate compared with Comparative Examples 1-3, however this improvement effect is not significant, thus the improvement effect on the cycle performance of the secondary batteries is also not significant. In Comparative Example 6-7, micropores are present on the surfaces of both the water-based positive electrode plates and the negative electrode plates, but in the prepared aqueous positive electrode plates, $(S_{12} \times H_{12} \times D_1)/(S_{11} \times C_1 \times H_{11})$ is greater than 1%, thus significantly reducing the energy density of the secondary batteries. In Comparative Example 8-10, micropores are present on the surface of the water-based positive electrode plates and the negative electrode plates, but in the prepared negative electrode plate, $(S_{22} \times H_{22} \times D_2)/(S_{21} \times C_2 \times H_{21})$ is greater than 2.5%, thus significantly reducing the energy density of the secondary batteries.

It should be noted that the present application is not limited to the above-mentioned embodiments. The above-mentioned embodiments are merely examples, and within the scope of the technical solutions of the present application, embodiments that have substantially the same configuration as the technical idea and exert the same effects are included in the technical scope of the present application. In addition, various modifications to the embodiments that can be conceived by those skilled in the art without departing from the scope of the spirit of the present application and other embodiments constructed by combining some constituent elements in the embodiments are also included in the scope of the present application.

What is claimed is:
1. An electrode assembly, comprising:
a water-based positive electrode plate; and
a negative electrode plate;

wherein:
the water-based positive electrode plate comprises a positive electrode current collector and a positive electrode film layer located on at least one surface of the positive electrode current collector, and the positive electrode film layer comprises a positive electrode active material;
the negative electrode plate comprises a negative electrode current collector and a negative electrode film layer located on at least one surface of the negative electrode current collector, and the negative electrode film layer comprises a negative electrode active material;
at least part of surface of the water-based positive electrode plate is provided with a plurality of first micropores, and satisfies:

$$0.001\% \le (S_{12} \times H_{12} \times D_1)/(S_{11} \times C_1 \times H_{11}) \le 1\%,$$

wherein $H_{11}$ represents a numerical value for the thickness of the water-based positive electrode plate in μm, $H_{12}$ represents a numerical value for a depth of the first micropores in μm, $S_{11}$ represents a numerical value for the area of the water-based positive electrode plate in m², $S_{12}$ represents a numerical value for a total area of the plurality of first micropores in m², $C_1$ represents a numerical value for a compaction density of the water-based positive electrode plate in g/cc, $D_1$ represents a numerical value for a volume average particle diameter Dv50 of the positive electrode active material in μm;
at least part of surface of the negative electrode plate is provided with a plurality of second micropores, and satisfies:

$$0 < (S_{22} \times H_{22} \times D_2)/(S_{21} \times C_2 \times H_{21}) \le 2.5\%,$$

wherein $H_{21}$ represents thickness of the negative electrode plate in μm, $H_{22}$ represents a numerical value for the depth of the second micropores in μm, $S_{21}$ represents a numerical value for the area of the negative electrode plate in m², $S_{22}$ represents a numerical value for a total area of the plurality of second micropores in m², $C_2$ represents a numerical value for a compaction density of the negative electrode plate in g/cc, $D_2$ represents a numerical value for a volume average particle diameter Dv50 of the negative electrode active material in μm.

2. The electrode assembly according to claim 1, wherein:

$$0.05\% \leq (S_{12} \times H_{12} \times D_1)/(S_{11} \times C_1 \times H_{11}) \leq 0.5\%.$$

3. The electrode assembly according to claim 1, wherein:

$$0.2\% \leq (S_{22} \times H_{22} \times D_2)/(S_{21} \times C_2 \times H_{21}) \leq 2.0\%.$$

4. The electrode assembly according to claim 1, wherein:
$0 < S_{12}/S_{11} \leq 2\%$; and/or
$30\% \leq H_{12}/H_{11} \leq 100\%$; and/or
$C_1$ is from 2.0 to 3.0; and/or
$D_1$ is from 0.5 to 1.5.

5. The electrode assembly according to claim 1, wherein:
$0 < S_{22}/S_{21} \leq 0.2\%$; and/or
$30\% \leq H_{22}/H_{21} \leq 100\%$; and/or
$C_2$ is from 1.2 to 2.0; and/or
$D_2$ is from 12 to 20.

6. The electrode assembly according to claim 1, wherein the electrode assembly satisfies: $0.1 \leq A/B \leq 1.0$, A represents $(S_{12} \times H_{12} \times D_1)/(S_{11} \times C_1 \times H_{11})$, and B represents $(S_{22} \times H_{22} \times D_2)/(S_{21} \times C_2 \times H_{21})$.

7. The electrode assembly according to claim 1, wherein the electrode assembly satisfies:
$0 < S_3/S_{22} \leq 5\%$, wherein $S_3$ represents a numerical value for an overlapping area of the plurality of first micropores and the plurality of second micropores in m².

8. The electrode assembly according to claim 1, wherein the first micropores satisfy at least one of following (1) to (4):
  (1) each of first micropores has regular shape;
  (2) each of first micropores has an equivalent diameter of from 1 μm to 200 μm;
  (3) a center-to-center distance between adjacent first micropores is from 1 mm to 10 mm; and
  (4) the plurality of first micropores are distributed in an array or arrays.

9. The electrode assembly according to claim 1, wherein the second micropores satisfy at least one of following (1) to (4):
  (1) each of second micropores has regular shape;
  (2) each of second micropores has an equivalent diameter of from 1 μm to 200 μm;
  (3) a center-to-center distance between adjacent second micropores is from 1 mm to 10 mm; and
  (4) the plurality of second micropores are distributed in an array or arrays.

10. The electrode assembly according to claim 1, wherein the positive electrode film layer further comprises one or more of a water-based binder and a conductive agent.

11. The electrode assembly according to claim 10, wherein the water-based binder comprises a compound mixture of xanthan gum and polyethyleneimine.

12. The electrode assembly according to claim 10, wherein the water-based binder comprises a compound mixture of acrylonitrile-acrylic acid copolymer and polyethyleneimine.

13. A secondary battery comprising an electrolyte and the electrode assembly according to claim 1.

14. A battery module comprising the secondary battery according to claim 13.

15. A battery pack comprising the secondary battery according to claim 13.

16. An electrical device comprising the secondary battery according to claim 13.

17. The electrode assembly according to claim 1, wherein the first micropores satisfy at least one of following (1) to (4):
  (1) each of first micropores has irregular shape;
  (2) each of first micropores has an equivalent diameter of from 1 μm to 200 μm;
  (3) a center-to-center distance between adjacent first micropores is from 1 mm to 10 mm; and
  (4) the plurality of first micropores are distributed in an array or arrays.

18. The electrode assembly according to claim 1, wherein the second micropores satisfy at least one of following (1) to (4):
  (1) each of second micropores has irregular shape;
  (2) each of second micropores has an equivalent diameter of from 1 μm to 200 μm;
  (3) a center-to-center distance between adjacent second micropores is from 1 mm to 10 mm; and
  (4) the plurality of second micropores are distributed in an array or arrays.

* * * * *